US012801902B2

(12) United States Patent
Pavlichenko et al.

(10) Patent No.: US 12,801,902 B2
(45) Date of Patent: Nov. 17, 2026

(54) METHOD AND SYSTEM FOR GENERATING TRAINING DATA FOR A MACHINE-LEARNING ALGORITHM

(71) Applicant: Direct Cursus Technology L.L.C, Dubai (AE)

(72) Inventors: Nikita Pavlichenko, Moscow (RU); Dmitry Ustalov, Saint Petersburg (RU)

(73) Assignee: Y.E. HUB ARMENIA LLC, Yerevan (AM)

( * ) Notice: Subject to any disclaimer, the term of this patent is extended or adjusted under 35 U.S.C. 154(b) by 313 days.

(21) Appl. No.: 18/586,141

(22) Filed: Feb. 23, 2024

(65) Prior Publication Data

US 2024/0303474 A1 Sep. 12, 2024

(30) Foreign Application Priority Data

Mar. 10, 2023 (RU) ........................... RU2023105639

(51) Int. Cl.
*G06N 3/0475* (2023.01)
*G06F 40/279* (2020.01)
(Continued)

(52) U.S. Cl.
CPC ......... *G06N 3/0475* (2023.01); *G06F 40/279* (2020.01); *G06N 3/08* (2013.01); *G06T 11/10* (2026.01)

(58) Field of Classification Search
CPC ........ G06N 3/0475; G06N 3/08; G06N 3/098; G06N 3/0985
See application file for complete search history.

(56) References Cited

U.S. PATENT DOCUMENTS 6,560,597 B1 5/2003 Dhillon et al.
7,366,705 B2 4/2008 Zeng et al.
(Continued)

FOREIGN PATENT DOCUMENTS

CN 103914478 A 7/2014
CN 104463424 A 3/2015
(Continued)

OTHER PUBLICATIONS

Chang et al., "Revolt: Collaborative Crowdsourcing for Labeling Machine Learning Datasets", published on May 2, 2017, pp. 2334-2346, CHI '17: Proceedings of the 2017 CHI Conference on Human Factors in Computing Systems, https://doi.org/10.1145/3025453.3026044.

(Continued)

*Primary Examiner* — Antonio A Caschera
(74) *Attorney, Agent, or Firm* — BCF LLP

(57) ABSTRACT

A textual description of a testing object and a set of keywords associated with the textual description are received. Augmented textual descriptions are generated by combining the textual description and keywords, and used to generate image candidates by a generative machine-learning model (GMLM). The image candidates are transmitted to human assessors for pairwise comparison to determine degrees of visual appeal. A training set of data is generated, including the augmented textual descriptions, the image candidates, and the degrees of visual appeal. The training set of data is used to fine-tune the GMLM model.

17 Claims, 8 Drawing Sheets

(51) Int. Cl.
*G06N 3/08* (2023.01)
*G06T 11/10* (2026.01)

(56) References Cited

U.S. PATENT DOCUMENTS

| | | | |
|---|---|---|---|
| 7,693,738 | B2 | 4/2010 | Guinta et al. |
| 7,747,083 | B2 | 6/2010 | Tawde et al. |
| 8,266,130 | B2 | 9/2012 | Jones et al. |
| 8,356,057 | B2 | 1/2013 | Greenshpan et al. |
| 8,498,892 | B1 | 7/2013 | Cohen et al. |
| 8,554,605 | B2 | 10/2013 | Oleson et al. |
| 8,626,545 | B2 | 1/2014 | Van et al. |
| 9,268,766 | B2 | 2/2016 | Bekkerman |
| 9,330,071 | B1 | 5/2016 | Ahmed et al. |
| 9,584,540 | B1 | 2/2017 | Chan et al. |
| 9,594,944 | B2 | 3/2017 | Kompalli et al. |
| 9,767,419 | B2 | 9/2017 | Venanzi et al. |
| 9,911,088 | B2 | 3/2018 | Nath et al. |
| 10,061,848 | B2 | 8/2018 | Basu et al. |
| 10,074,200 | B1 | 9/2018 | Yeturu et al. |
| 10,095,688 | B1 | 10/2018 | Schilling et al. |
| 10,162,734 | B1 | 12/2018 | Podgorny et al. |
| 10,192,180 | B2 | 1/2019 | Prabhakara et al. |
| 10,445,671 | B2 | 10/2019 | Dubey et al. |
| 10,685,329 | B2 | 6/2020 | Taylor et al. |
| 10,762,430 | B2 | 9/2020 | Ehsani et al. |
| 10,978,056 | B1 | 4/2021 | Challa et al. |
| 11,481,650 | B2 | 10/2022 | Bugakova et al. |
| 11,900,284 | B2 | 2/2024 | Cuartero |
| 11,995,803 | B1 * | 5/2024 | Karpman .................. G06T 5/70 |
| 12,148,417 | B1 | 11/2024 | Cardella et al. |
| 2002/0032591 | A1 | 3/2002 | Mahaffy et al. |
| 2003/0154181 | A1 | 8/2003 | Liu et al. |
| 2006/0026240 | A1 | 2/2006 | Anthony et al. |
| 2007/0226207 | A1 | 9/2007 | Tawde |
| 2007/0260601 | A1 | 11/2007 | Thompson et al. |
| 2008/0027913 | A1 | 1/2008 | Chang et al. |
| 2008/0120129 | A1 | 5/2008 | Seubert et al. |
| 2009/0204470 | A1 | 8/2009 | Weyl et al. |
| 2010/0153156 | A1 | 6/2010 | Guinta et al. |
| 2010/0293026 | A1 | 11/2010 | Vojnovic et al. |
| 2011/0173183 | A1 | 7/2011 | Dasdan et al. |
| 2011/0313801 | A1 | 12/2011 | Biewald et al. |
| 2012/0005131 | A1 | 1/2012 | Horvitz et al. |
| 2012/0130934 | A1 | 5/2012 | Brillhart et al. |
| 2012/0131572 | A1 | 5/2012 | Shae et al. |
| 2012/0150579 | A1 | 6/2012 | De Wit et al. |
| 2012/0265573 | A1 | 10/2012 | Van et al. |
| 2013/0006717 | A1 | 1/2013 | Oleson et al. |
| 2013/0029769 | A1 | 1/2013 | Lee et al. |
| 2013/0096968 | A1 | 4/2013 | Van Pelt et al. |
| 2013/0111488 | A1 | 5/2013 | Gatti et al. |
| 2013/0132080 | A1 | 5/2013 | Williams et al. |
| 2013/0159292 | A1 | 6/2013 | Larlus et al. |
| 2013/0231969 | A1 | 9/2013 | Van et al. |
| 2013/0317871 | A1 | 11/2013 | Kulkarni |
| 2014/0122188 | A1 | 5/2014 | Van Pelt et al. |
| 2014/0172767 | A1 | 6/2014 | Chen et al. |
| 2014/0211044 | A1 | 7/2014 | Lee et al. |
| 2014/0214709 | A1 | 7/2014 | Greaney et al. |
| 2014/0229413 | A1 | 8/2014 | Dasgupta et al. |
| 2014/0278634 | A1 | 9/2014 | Horvitz et al. |
| 2014/0321737 | A1 | 10/2014 | Movellan et al. |
| 2014/0343984 | A1 | 11/2014 | Shahabi et al. |
| 2014/0355835 | A1 | 12/2014 | Rodriguez-Serrano et al. |
| 2015/0004465 | A1 | 1/2015 | Ozaki et al. |
| 2015/0074033 | A1 | 3/2015 | Shah et al. |
| 2015/0086072 | A1 | 3/2015 | Kompalli et al. |
| 2015/0178659 | A1 | 6/2015 | Dai et al. |
| 2015/0186784 | A1 | 7/2015 | Barborak et al. |
| 2015/0186951 | A1 | 7/2015 | Wilson |
| 2015/0193695 | A1 | 7/2015 | Cruz Mota et al. |
| 2015/0213392 | A1 | 7/2015 | Kittur et al. |
| 2015/0254593 | A1 | 9/2015 | Ramos et al. |
| 2015/0254596 | A1 | 9/2015 | Nayar et al. |
| 2015/0254785 | A1 | 9/2015 | Yang et al. |
| 2015/0262111 | A1 | 9/2015 | Yu et al. |
| 2015/0317582 | A1 | 11/2015 | Nath et al. |
| 2015/0332188 | A1 | 11/2015 | Yankelevich et al. |
| 2015/0347519 | A1 | 12/2015 | Hornkvist et al. |
| 2015/0356488 | A1 | 12/2015 | Eden et al. |
| 2015/0356489 | A1 | 12/2015 | Kazai et al. |
| 2015/0363741 | A1 | 12/2015 | Chandra et al. |
| 2016/0034840 | A1 | 2/2016 | Venanzi et al. |
| 2016/0035785 | A1 | 2/2016 | Oganesian |
| 2016/0041849 | A1 | 2/2016 | Naveh et al. |
| 2016/0100000 | A1 | 4/2016 | Dey et al. |
| 2016/0132815 | A1 | 5/2016 | Itoko et al. |
| 2016/0140477 | A1 | 5/2016 | Karanam et al. |
| 2016/0162478 | A1 | 6/2016 | Blassin et al. |
| 2016/0162837 | A1 | 6/2016 | Muntés Mulero et al. |
| 2016/0180279 | A1 | 6/2016 | Koerner |
| 2016/0210570 | A1 | 7/2016 | Lee et al. |
| 2016/0232221 | A1 | 8/2016 | Mccloskey et al. |
| 2016/0342692 | A1 | 11/2016 | Bennett |
| 2017/0011077 | A1 | 1/2017 | Kypreos et al. |
| 2017/0011328 | A1 | 1/2017 | Zhao et al. |
| 2017/0024931 | A1 | 1/2017 | Sheffer et al. |
| 2017/0046794 | A1 | 2/2017 | Shukla et al. |
| 2017/0052761 | A1 | 2/2017 | Gunshor et al. |
| 2017/0061341 | A1 | 3/2017 | Haas et al. |
| 2017/0061356 | A1 | 3/2017 | Haas et al. |
| 2017/0061357 | A1 | 3/2017 | Dubey et al. |
| 2017/0076715 | A1 | 3/2017 | Ohtani et al. |
| 2017/0103451 | A1 | 4/2017 | Alipov et al. |
| 2017/0154313 | A1 | 6/2017 | Duerr et al. |
| 2017/0161477 | A1 | 6/2017 | Liu et al. |
| 2017/0185944 | A1 | 6/2017 | Volkov et al. |
| 2017/0200101 | A1 | 7/2017 | Kumar et al. |
| 2017/0220973 | A1 | 8/2017 | Byham et al. |
| 2017/0228749 | A1 | 8/2017 | Larvol et al. |
| 2017/0293859 | A1 | 10/2017 | Gusev et al. |
| 2017/0309193 | A1 | 10/2017 | Joseph et al. |
| 2017/0323211 | A1 | 11/2017 | Bencke et al. |
| 2017/0353477 | A1 | 12/2017 | Faigon et al. |
| 2017/0364810 | A1 | 12/2017 | Gusev et al. |
| 2017/0372225 | A1 | 12/2017 | Foresti et al. |
| 2018/0005077 | A1 | 1/2018 | Wang et al. |
| 2018/0143980 | A1 | 5/2018 | Tanikella et al. |
| 2018/0144283 | A1 | 5/2018 | Freitas et al. |
| 2018/0144654 | A1 | 5/2018 | Olsen |
| 2018/0196579 | A1 | 7/2018 | Standefer et al. |
| 2018/0285176 | A1 | 10/2018 | Mozhaev et al. |
| 2018/0293325 | A1 | 10/2018 | Manickavasagam |
| 2018/0331897 | A1 | 11/2018 | Zhang et al. |
| 2018/0357286 | A1 | 12/2018 | Wang et al. |
| 2019/0095801 | A1 | 3/2019 | Saillet et al. |
| 2019/0114320 | A1 | 4/2019 | Patwardhan et al. |
| 2019/0138174 | A1 | 5/2019 | Deets, Jr. et al. |
| 2019/0258985 | A1 | 8/2019 | Guastella et al. |
| 2019/0266289 | A1 | 8/2019 | Bartholomew |
| 2019/0318291 | A1 | 10/2019 | Diriye et al. |
| 2019/0392547 | A1 | 12/2019 | Katouzian et al. |
| 2020/0027052 | A1 | 1/2020 | Aiyer |
| 2020/0089684 | A1 | 3/2020 | Gotmanov |
| 2020/0175383 | A1 | 6/2020 | Blumenfeld et al. |
| 2020/0327582 | A1 | 10/2020 | Fedorova et al. |
| 2020/0364282 | A1 | 11/2020 | Kent |
| 2020/0372338 | A1 | 11/2020 | Woods et al. |
| 2020/0380410 | A1 | 12/2020 | Drutsa |
| 2021/0042530 | A1 | 2/2021 | Kim et al. |
| 2021/0073596 | A1 | 3/2021 | Bezzubtseva et al. |
| 2021/0073703 | A1 | 3/2021 | Lioznova et al. |
| 2021/0133606 | A1 | 5/2021 | Bugakova et al. |
| 2021/0264106 | A1 | 8/2021 | Li et al. |
| 2022/0277362 | A1 | 9/2022 | Prendki et al. |
| 2022/0292432 | A1 | 9/2022 | Biryukov et al. |
| 2022/0374770 | A1 * | 11/2022 | Pavlichenko .......... G06V 10/82 |
| 2024/0370793 | A1 | 11/2024 | Smith et al. |

FOREIGN PATENT DOCUMENTS

| | | |
|---|---|---|
| CN | 105608318 A | 5/2016 |
| CN | 106203893 A | 12/2016 |

(56) References Cited

FOREIGN PATENT DOCUMENTS

| | | | |
|---|---|---|---|
| CN | 106327090 | A | 1/2017 |
| CN | 106446287 | A | 2/2017 |
| CN | 106557891 | A | 4/2017 |
| CN | 107767055 | A | 3/2018 |
| CN | 107767058 | A | 3/2018 |
| CN | 107909262 | A | 4/2018 |
| CN | 104794573 | A | 5/2018 |
| CN | 109272003 | A | 1/2019 |
| CN | 109376237 | A | 2/2019 |
| CN | 109522545 | A | 3/2019 |
| CN | 109544504 | A | 3/2019 |
| CN | 109670727 | A | 4/2019 |
| CN | 110020098 | A | 7/2019 |
| CN | 110503396 | A | 11/2019 |
| CN | 110909880 | A | 3/2020 |
| CN | 110928764 | A | 3/2020 |
| CN | 111191952 | A | 5/2020 |
| CN | 111291973 | A | 6/2020 |
| CN | 111723930 | A | 9/2020 |
| CN | 113140020 | A | 7/2021 |
| CN | 109271537 | B | 11/2021 |
| EP | 3438897 | A1 | 2/2019 |
| KR | 102155790 | B1 | 9/2020 |
| KR | 102156582 | B1 | 9/2020 |
| RU | 2632143 | C1 | 10/2017 |
| RU | 2672171 | C1 | 11/2018 |
| RU | 2717787 | C1 | 3/2020 |
| RU | 2744032 | C2 | 3/2021 |
| RU | 2744038 | C2 | 3/2021 |
| WO | 0010296 | A2 | 2/2000 |
| WO | 2017116931 | A2 | 7/2017 |
| WO | 2017222738 | A1 | 12/2017 |
| WO | 2019200780 | A1 | 10/2019 |

OTHER PUBLICATIONS

Krivosheev et al., "Detecting and Preventing Confused Labels in Crowdsourced Data", published on Jul. 1, 2020, Proceedings of the VLDB Endowment, vol. 13, Issue 12, pp. 2522-2535, https://doi.org/10.14778/3407790.3407842.

Office Action issued on Jul. 3, 2025 in respect of the related U.S. Appl. No. 17/576,301.

Office Action issued on Mar. 25, 2025 in respect of the related U.S. Appl. No. 17/670,662.

Notice of Allowance dated May 12, 2025 received in respect of a related U.S. Appl. No. 17/670,662.

Zhiyao Li, et al., "A unified task recommendation strategy for realistic mobile crowdsourcing system", Theoretical Computer Science, vol. 857, 2021, pp. 43-58, ISSN 0304-3975, https://doi.org/10.1016/j.tcs.2020.12.034, (https://www.sciencedirect.com/science/article/pii/S030439752030757X) (Jan. 6, 2021).

Karim et al., "Learn or Earn? Intelligent Task Recommendations for Competitive Crowdsourced Software Development", Proceedings, of the 51st Hawaii International Conference on System Sciences, 2018, pp. 5604-5613, URI: http://hdl.handle.net/10125/50589 ISBN: 978-0-9981331-1-9. (Jan. 6, 2018).

Vaibhav B. Sinha et al., "Fast Dawid-Skene: A Fast Vote Aggregation Scheme for Sentiment Classification", Department of Computer Science and Engineering, Indian Institute of Technology Hyderabad, Telangana, Sep. 7, 2018; https://arxiv.org/abs/1803.02781.

Hongwei Li et al., "Error Rate Bounds in Crowdsourcing Models", Department of Statistics, UC Berkeley, Department of EECS, UC Berkeley and Microsoft Research, Redmond, Jul. 10, 2013. https://arxiv.org/pdf/1307.2674.pdf.

Hongwei Li et al., "Error Rate Bounds and Iterative Weighted Majority Voting for Crowdsourcing", University of California, Berkeley, Nov. 15, 2014; https://arxiv.org/pdf/1411.4086.pdf.

Hideaki et al., "Analysis of Minimax Error Rate for Crowdsourcing and Its Application to Worker Clustering Model", https://arxiv.org/pdf/1802.04551.pdf Jun. 9, 2018.

Changbo et al., "Online Crowdsourcing", https://arxiv.org/abs/1512.02393, Submitted on Dec. 8, 2015 (v1), last revised Feb. 8, 2019 (this version, v2).

Vikas et al., "Eliminating Spammers and Ranking Annotators for Crowdsourced Labeling Tasks", Journal of Machine Learning Research 13 (2012) 491-518 ; http://www.jmlr.org/papers/volume13/raykar12a/raykar12a.pdf.

Feldman et al., "Behavior-Based Quality Assurance in Crowdsourcing Markets", Zurich Open Repository and Archive, University of Zurich, 2014. https://www.zora.uzh.ch/id/eprint/98779/1/Feldman.pdf.

Lease, "On Quality Control and Machine Learning in Crowdsourcing", School of Information, University of Texas at Austin; 2011, https://www.ischool.utexas.edu/~ml/papers/lease-hcomp11.pdf.

Gadiraju, "Understanding Malicious Behavior in Crowdsourcing Platforms: The Case of Online Surveys", http://eprints.whiterose.acuk/95877/1/Understanding%20malicious%20behaviour.pdf; 2015 https://doi.org/10.1145/2702123.2702443.

Carsten Eickhoff, "Cognitive Biases in Crowdsourcing", Dept. of Computer Science, Zurich, Switzerland, 2018, https://brown.edu/Research/AI/files/pubs/wsdm18.pdf.

Ece Kamar, "Identifying and Accounting for Task-Dependent Bias in Crowdsourcing", Microsoft Research, Redmond, WA, USA, 2015. http://erichorvitz.com/hcomp_2015_learning_bias.pdf.

D. Sánchez-Charles, "Worker ranking determination in crowdsourcing platforms using aggregation functions," 2014 IEEE International Conference on Fuzzy Systems (FUZZ-IEEE), Beijing, 2014, pp. 1801-1808.

Khazankin, "QOS-Based Task Scheduling in Crowdsourcing Environments", Distributed Systems Group, Vienna University of Technology, Argentinierstrasse 8/184-1, A-1040 Vienna, Austria, 2011.

Yuen, "Task recommendation in crowdsourcing systems", Crowdkdd '12 Proceedings of The First International Workshop on Crowdsourcing and Data Mining, pp. 22-26, Beijing, China, Aug. 2012.

Ustalov "Towards the Automated Collaborative Process for Language Resource Construction", Inzhenernyy vestnik Dona Journal, Issue No. 1(48), Published Mar. 20, 2018.

Yu, "Software Crowdsourcing Task Allocation Algorithm Based on Dynamic Utility", IEEE Access ( vol. 7) pp. 33094-33106, Published Mar. 13, 2019.

Huang, "Enhancing reliability using peer consistency evaluation in human computation". Published Mar. 18, 2013 in CSCW 2013—Proceedings of the 2013 ACM Conference on Computer Supported Cooperative Work (pp. 639-647). (Proceedings of the ACM Conference on Computer Supported Cooperative Work, CSCW). https://doi.org/10.1145/2441776.2441847.

Qiu, "CrowdEval: A Cost-Efficient Strategy to Evaluate Crowdsourced Worker's Reliability", AAMAS '18: Proceedings of the 17th International Conference on Autonomous Agents and MultiAgent Systems, Jul. 2018, pp. 1486-1494.

Hung, "An Evaluation of Aggregation Techniques in Crowdsourcing", Web Information Systems Engineering—WISE 2013, 2013, vol. 8181, ISBN : 978-3-642-41153-3.

P. Radha et al. "An EREC framework for e-contract modeling, enactment and monitoring", published on Oct. 2004, Data & Knowledge Engineering, vol. 51, Issue 1, pp. 31-58, https://doi.org/10.1016/j.datak.2004.03.006.

Chittilappilly et al. "A Survey of General-Purpose Crowdsourcing Techniques", Published on Sep. 1, 2016, IEEE Transactions on Knowledge and Data Engineering, vol. 28, Issue 9, pp. 2246-2266.

Hettiachchi et al.A Survey on Task Assignment in Crowdsourcing, Published on Nov. 15, 2021, pp. 1-36, https://arxiv.org/pdf/2111.08501.pdf.

List et al.,"An Evaluation of Conceptual Business Process Modelling Languages", Published on Apr. 23, 2006, SAC'06, pp. 1532-1539.

Li et al.,"Crowdsourced Data Management: A Survey", Published on Apr. 19, 2017, IEEE Transactions on Knowledge and Data Engineering, pp. 1-23, DOI:10.1109/ICDE.2017.26.

Federova et al.,"Latent Distribution Assumption for Unbiased and Consistent Consensus Modelling", Published on Jun. 20, 2019, arXiv:1906.08776v1.

(56) References Cited

OTHER PUBLICATIONS

Bugakova et al.,"Aggregation of pairwise comparisons with reduction of biases", Published on Jun. 9, 2019, arXiv:1906.03711v1.
Simpson et al., "Scalable Bayesian Preference Learning for Crowds", Published on Dec. 11, 2019 arXiv:1912.01987v2.
Thorsten et al. "A Collaborative Document Management Environment for Teaching and Learning", published on Jan. 2000, CVE, San Francisco, pp. 197-198 DOI:10.1145/351006.351044.
Schnitzer et al.,"Demands on task recommendation in crowdsourcing platforms—the worker's perspective", Sep. 2015, Crowd Rec 19, 2015, pp. 1-6.
Sajadmanesh et al.,"NP-GLM: A Non-Parametric Method for Temporal Link Prediction", Published on Jun. 21, 2017, Department of Computer Engineering, Sharif University of Technology, Tehran, Iran, pp. 1-7.
Zhou et.al—LAFITE: Towards Language-Free Training for Text-to-Image Generation; Computer Science—Computer Vision and Pattern Recognition Nov. 27, 2021.
Russian Search Report dated Jan. 18, 2024 issued in respect of the counterpart Russian Patent Application No. 2021127059.
Russian Search Report dated Mar. 22, 2024 issued in respect of the counterpart Russian Patent Application No. 2021106657.
Russian Search Report dated Aug. 23, 2024 issued in respect of the counterpart Russian Patent Application No. 2022129234.
Russian Search Report dated Oct. 4, 2024 issued in respect of the related Russian Patent Application No. 2023105639.
Office Action issued on Apr. 28, 2026 in respect of the related U.S. Appl. No. 18/386,597.

* cited by examiner

METHOD AND SYSTEM FOR GENERATING TRAINING DATA FOR A MACHINE-LEARNING ALGORITHM

CROSS-REFERENCE

The present application claims priority to Russian Patent Application No. 2023105639, entitled "Method and System for Generating Training Data for a Machine-Learning Algorithm", filed Mar. 10, 2023, the entirety of which is incorporated herein by reference.

FIELD

The present technology relates to methods and systems for generating training data for a machine-learning algorithm (MLA); and more particularly, to methods and systems of fine-tuning a generative machine-learning model, pretrained to generate images based on textual descriptions thereof.

BACKGROUND

Certain generative machine-learning models (GMLMs) can be trained to generate media content items, such as audio feeds, images, or video clips, based on corresponding textual descriptions of the media content items. For example, a given GMLM, such as one a DALL-E™ GMLM or a CLIP™ GMLM, may be trained to generate an image of an object in accordance with a textual description provided by a user. For example, the user can provide to the given GMLM a query reading, for example, "Cat in the old cartoon drawing style", "Cat in a Disney cartoon style", or "Black cat on a white background in a pastel drawing", and, in response, the given GMLM can be configured to generate a respective image of cat according to the desired rendering instruction.

However, although trained on a comparatively large training datasets, such a GMLM may disregard certain quality categories associated with the generated images. For example, the GMLM may be "unaware" of an extent of visual appeal of the generated images to the users that have requested these images. As a result, the users that have considered certain generated images dissatisfactory in terms of the visual appeal, that is, have not gained expected aesthetic pleasure from appreciating these images, may be dissatisfied with the GMLM, in general.

Certain prior art approaches have been proposed to tackle the above-identified technical problem.

Chinese Patent No.: 113,140,020-A, issued on Oct. 14, 2022, assigned to University of Electronic Science and Technology of China, and entitled "METHOD FOR GENERATING IMAGE BASED ON TEXT OF COUNTERMEASURE NETWORK GENERATED BY ACCOMPANYING SUPERVISION" discloses a method for generating an image based on a text of an antagonistic network generated along with supervision, which is applied to the field of conditional image generation and aims at solving the problems of complex network structure and excessive calculation cost in the prior art; according to the method, the image model is generated by utilizing the hierarchically nested accompanying supervision framework design text, the discriminators are connected to the three middle hidden layers of the single-flow generator in an indirect mode, the image generation process is subjected to explicit countermeasure supervision, the transparency of the generation process can be effectively improved, and the error propagation path can be shortened; the method avoids stacking a plurality of generated confrontation networks, can greatly reduce the complexity and parameter quantity of the model, and improves the training speed.

SUMMARY

It is an object of the present technology to ameliorate at least one inconvenience present in the prior art.

Developers of the present technology have appreciated that the given GMLM, which has been pretrained to generate images based on the textual descriptions thereof, can further be fine-tuned to "appreciate" the category of the visual attractiveness of the generated images and can thus be trained to generate more visually appealing images.

More specifically, the developers have devised systems and methods directed to (i) receiving, for a textual description of a given testing object, a set of keywords (such as "vivid colors", "detailed", or "high resolution", for example), generating, for the given testing object, augmented textual descriptions; (ii) feeding the augmented textual descriptions to the given GMLM to generate a set of image candidates of the given testing object; (iii) determining a respective degree of visual appeal of each one the set of image candidates; and (iv) fine-tuning the GMLM based on the so generated image candidates of testing objects and the corresponding degrees of visual appeal to generate more visually appealing images of objects.

In some non-limiting embodiments of the present technology, the present methods and systems are further directed to (i) identifying those keywords that are associated with highest degrees of the visual appeal of the respective image candidates; and (ii) using these keywords as suggests for generating textual descriptions of the other objects.

According to certain non-limiting embodiments of the present technology, the determining the respective degrees of visual appeal of each one of the set of image candidates can be executed by human assessors, for example, by submitting a respective task to a crowdsourcing platform, such as an Amazon Mechanical Turk™ crowdsourcing platform or a Yandex Toloka™ crowdsourcing platform, for example. For example, the respective task can instruct the human assessors of the crowdsourcing platform that they conduct a pairwise comparison of the provided image candidates in terms of their subjective visual appeal thereto. Further, the respective degree of the visual appeal for a given image candidate can be determined as being a number of instances where the given image candidate has been identified as being more visually appealing as another provided image candidate, across all the human assessors involved in this task.

Thus, the methods and systems described herein may help improve the output of the GMLM in terms of the visual appeal, which may result in enhancement of user experience of the users of the GMLM.

More specifically, in accordance with a first broad aspect of the present technology, there is provided a computer-implemented method of fine-tuning a generative machine-learning model (GMLM) to generate more visually appealing images of objects. The GMLM has been trained to generate images of the objects based on textual descriptions thereof. The method is executable by a server configured to access the GMLM. The method comprises: receiving, by the server, a given textual description of a testing object for generating, by the GMLM, a testing image thereof, the given textual description being indicative of what is to be depicted in the testing image in a natural language; receiving, by the server, a set of keywords associated with the given textual description receiving, by the server, a set of keywords associated with the given textual description, a given keyword of the set of keywords being indicative of at least one rendering instruction for rendering the testing object in the testing image; generating, based on the set of keywords, a set of augmented textual descriptions of the image, a given augmented textual description including a combination of the given textual description and a respective keyword of the set of keywords; feeding, by the server, to the GMLM, each one of the set of augmented textual descriptions to generate a set of image candidates of the object; transmitting, by the server, the set of image candidates of the testing object to a plurality of human assessors for pairwise comparison of a given image candidate of the set of image candidates with an other image candidate of the set of image candidates based on how visually appealing each one of the given image candidate and the other image candidate to a given human assessor of the plurality of human assessors, the pairwise comparison being executed without the plurality of human assessors knowing of the set of keywords used for generating the set of image candidates; determining, by the server, for the given image candidate, a respective degree of visual appeal as being a number of instances where the given image candidate has been identified as being more visually appealing than the other image candidate of the set of image candidates across the plurality of human assessors; generating, by the server, a training set of data, the training set of data including a plurality of training digital objects, a given training digital object of which includes: (i) the given textual description of the testing object; (ii) the given image candidate thereof; and (iii) the respective degree of visual appeal associated therewith; and feeding, by the server, the plurality of training digital objects to the GMLM, thereby fine-tuning the GMLM to generate the more visually appealing images of the objects.

In some implementations of the method, the at least one rendering instruction is indicative of a respective feature of a respective image candidate of the training object including at least one of: (i) a stylistic feature of the respective image candidate; and (ii) a meta feature of the respective image candidate.

In some implementations of the method, the stylistic feature comprises at least one of: (i) a colour scheme of the respective image candidate; (ii) intensity of at least one colour of the respective image candidate; (iii) an artistic style of the respective image candidate; and (iv) features associated with at least one composition element of the respective image candidate.

In some implementations of the method, the at least one composition element comprises: a texture of the respective image candidate, a symmetry of the respective image candidate, an asymmetry of the respective image candidate, a depth of field of the respective image candidate, lines in the respective image candidate, curves in the respective image candidate, frames of the respective image candidate, a contrast of the respective image candidate, a viewpoint onto the training object in the respective image candidate, a proportion of negative space in the respective image candidate, a proportion of a filled space in the respective image candidate, a foreground of the respective image candidate, a background of the respective image candidate, and a visual tension of the respective image candidate.

In some implementations of the method, the meta feature of the respective image candidate comprises at least one of: (i) a resolution of the respective image candidate; (ii) a size of the respective image candidate; and (iii) a format of the respective image candidate.

In some implementations of the method, the fine-tuning the GMLM comprises: during a first fine-tuning stage, training, by the server, the GMLM to determine a respective value indicative of which image candidate of a given pair of image candidates of the testing object is associated with a greater respective degree of visual appeal; during a second fine-tuning stage following the first fine-tuning stage, training, by the server, the GMLM to generate the more visually appealing images of the objects by maximizing a total value determined as being a combination of respective values.

In some implementations of the method, the feeding the training set of data to the GMLM comprises: during the first fine-tuning stage, for the given training digital object, feeding, by the server, to the GMLM: (i) the given textual description of the testing object; (ii) the given image candidate thereof; and (iii) the respective degree of visual appeal associated therewith; and during the second fine-tuning stage, for the given training object, feeding, by the server, to the GMLM, the given textual description used for generating the given image candidate.

In some implementations of the method, prior to the training, the method further comprises adding to the GMLM a Feed-Forward Neural Network layer.

In some implementations of the method, the maximizing the total value comprises applying a Proximal Policy Optimization algorithm.

In some implementations of the method, the method further comprises using the GMLM to generate the more visually appealing images of the objects. The using comprising: receiving, by the server, from a user electronic device, an in-use textual description of an in-use object; and feeding, by the server, the in-use textual description to the GMLM to generate a respective in-use image of the in-use object.

In some implementations of the method, the GMLM comprises a diffusion MLM.

In accordance with a second broad aspect of the present technology, there is provided a computer-implemented method of generating keywords for generating augmented textual descriptions of objects for a generative machine-learning model (GMLM). The GMLM has been trained to generate images of the objects based on textual descriptions thereof. The method is executable by a server configured to access the GMLM. The method comprises: receiving, by the server, a given textual description of a testing object for generating, by the GMLM, a testing image thereof, the given textual description being indicative of what is to be depicted in the testing image in a natural language; receiving, by the server, a set of keywords associated with the given textual description, a given keyword of the set of keywords being indicative of at least one rendering instruction for rendering the testing object in the testing image; generating, based on the set of keywords, a set of augmented textual descriptions of the image, a given augmented textual description including a combination of the given textual description and a respective keyword of the set of keywords; feeding, by the server, to the GMLM, each one of the set of augmented textual descriptions to generate a set of image candidates of the object; transmitting, by the server, the set of image candidates of the testing object to a plurality of human assessors for pairwise comparison of a given image candidate of the set of image candidates with an other image candidate of the set of image candidates based on how visually appealing each one of the given image candidate and the other image candidate to a given human assessor of the plurality of human assessors, the pairwise comparison being executed without the plurality of human assessors knowing of the set of keywords used for generating the set of image candidates; determining, by the server, for the given image candidate, a respective degree of visual appeal as being a number of instances where the given image candidate has been identified as being more visually appealing than the other image candidate of the set of image candidates across the plurality of human assessors; ranking, by the server, the set of image candidates according to respective degrees of the visual appeal associated therewith; determining, by the server, reference key words as being those of the set of keywords that are part of those of the set of augmented textual descriptions associated with a predetermined number of top ranked image candidates; and outputting, by the server, the reference key words as candidates for generating augmented textual descriptions of other objects for the GMLM.

Further, in accordance with a third broad aspect of the present technology, there is provided a server for fine-tuning a generative machine-learning model (GMLM), which has been trained to generate images of objects based on textual descriptions thereof, to generate more visually appealing images of the objects. The server comprises a processor and non-transitory computer-readable medium storing instructions. The processor, upon executing the instructions, is configured to: receive a given textual description of a testing object for generating, by the GMLM, a testing image thereof, the given textual description being indicative of what is to be depicted in the testing image in a natural language; receive a set of keywords associated with the given textual description receiving, by the server, a set of keywords associated with the given textual description, a given keyword of the set of keywords being indicative of at least one rendering instruction for rendering the testing object in the testing image; generate, based on the set of keywords, a set of augmented textual descriptions of the image, a given augmented textual description including a combination of the given textual description and a respective keyword of the set of keywords; feed, by the server, to the GMLM, each one of the set of augmented textual descriptions to generate a set of image candidates of the object; transmit the set of image candidates of the testing object to a plurality of human assessors for pairwise comparison of a given image candidate of the set of image candidates with an other image candidate of the set of image candidates based on how visually appealing each one of the given image candidate and the other image candidate to a given human assessor of the plurality of human assessors, the pairwise comparison being executed without the plurality of human assessors knowing of the set of keywords used for generating the set of image candidates; determine, for the given image candidate, a respective degree of visual appeal as being a number of instances where the given image candidate has been identified as being more visually appealing than the other image candidate of the set of image candidates across the plurality of human assessors; generate a training set of data, the training set of data including a plurality of training digital objects, a given training digital object of which includes: (i) the given textual description of the testing object; (ii) the given image candidate thereof; and (iii) the respective degree of visual appeal associated therewith; and feed the plurality of training digital objects to the GMLM, thereby fine-tuning the GMLM to generate the more visually appealing images of the objects.

In some implementations of the server, the at least one rendering instruction is indicative of a respective feature of a respective image candidate of the training object including at least one of: (i) a stylistic feature of the respective image candidate; and (ii) a meta feature of the respective image candidate.

In some implementations of the server, to fine-tune the GMLM, the processor is configured to: during a first fine-tuning stage, train the GMLM to determine a respective value indicative of which image candidate of a given pair of image candidates of the testing object is associated with a greater respective degree of visual appeal; during a second fine-tuning stage following the first fine-tuning stage, train the GMLM to generate the more visually appealing images of the objects by maximizing a total value determined as being a combination of respective values.

In some implementations of the server, the processor is configured to feed the training set of data to the GMLM by: during the first fine-tuning stage, for the given training digital object, feeding to the GMLM: (i) the given textual description of the testing object; (ii) the given image candidate thereof; and (iii) the respective degree of visual appeal associated therewith; and during the second fine-tuning stage, for the given training object, feeding to the GMLM, the given textual description used for generating the given image candidate.

In some implementations of the server, prior to training the GMLM during the first fine-tuning stage, the processor is further configured to add to the GMLM a Feed-Forward Neural Network layer.

In some implementations of the server, to maximize the total value, the processor is configured to apply a Proximal Policy Optimization algorithm.

In some implementations of the server, the processor is further configured to use the GMLM to generate the more visually appealing images of the objects, by: receiving, from a user electronic device, an in-use textual description of an in-use object; and feeding the in-use textual description to the GMLM to generate a respective in-use image of the in-use object.

In some implementations of the server, the GMLM comprises a diffusion MLM.

In the context of the present specification, a “server” is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a “server” is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression “at least one server”.

In the context of the present specification, “client device” is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression “a client device” does not preclude multiple client devices being used in receiving/sending, carrying out or causing to be carried out any task or request, or the consequences of any task or request, or steps of any method described herein.

In the context of the present specification, a “database” is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression “information” includes information of any nature or kind whatsoever capable of being stored in a database. Thus information includes, but is not limited to audiovisual works (images, movies, sound records, presentations, etc.), data (location data, numerical data, etc.), text (opinions, comments, questions, messages, etc.), documents, spreadsheets, lists of words, etc.

In the context of the present specification, the expression “component” is meant to include software (appropriate to a particular hardware context) that is both necessary and sufficient to achieve the specific function(s) being referenced.

In the context of the present specification, the expression “computer usable information storage medium” is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words “first”, “second”, “third”, etc. have been used as adjectives only for the purpose of allowing for distinction between the nouns that they modify from one another, and not for the purpose of describing any particular relationship between those nouns. Thus, for example, it should be understood that the use of the terms “first server” and “third server” is not intended to imply any particular order, type, chronology, hierarchy or ranking (for example) of/between the server, nor is their use (by itself) intended imply that any “second server” must necessarily exist in any given situation. Further, as is discussed herein in other contexts, reference to a “first” element and a “second” element does not preclude the two elements from being the same actual real-world element. Thus, for example, in some instances, a “first” server and a “second” server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
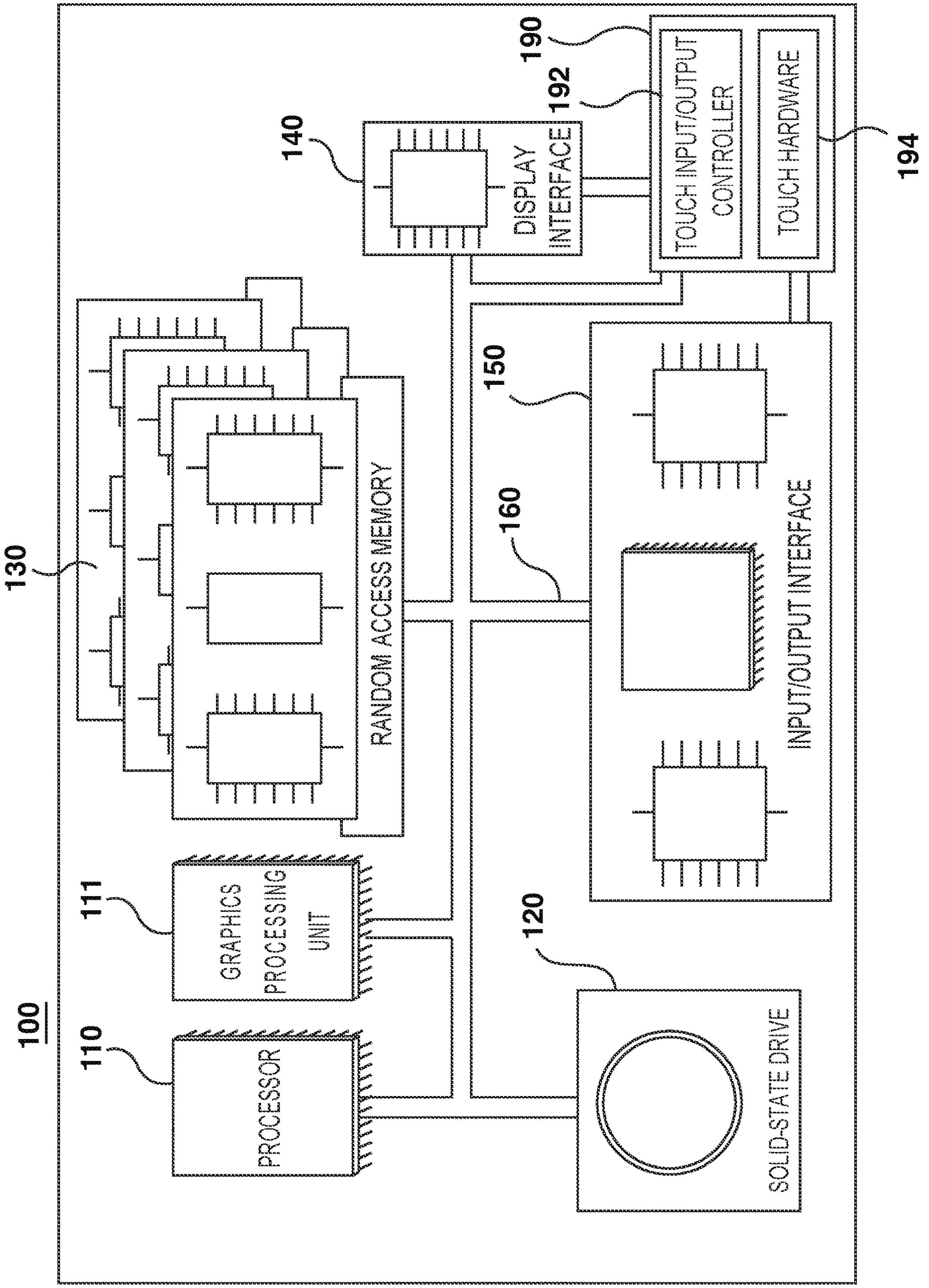
FIG. 1 depicts a schematic diagram of an example computer system for implementing certain non-limiting embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some non-limiting embodiments of the present technology, the touchscreen 190 is the display. The touchscreen 190 may equally be referred to as a touchscreen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not depicted), a mouse (not depicted) or a trackpad (not depicted) allowing the user to interact with the computer system 100 in addition to or instead of the touchscreen 190.

It is noted that some components of the computer system 100 can be omitted in some non-limiting embodiments of the present technology. For example, the touchscreen 190 can be omitted, especially (but not limited to) where the computer system is implemented as a server.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
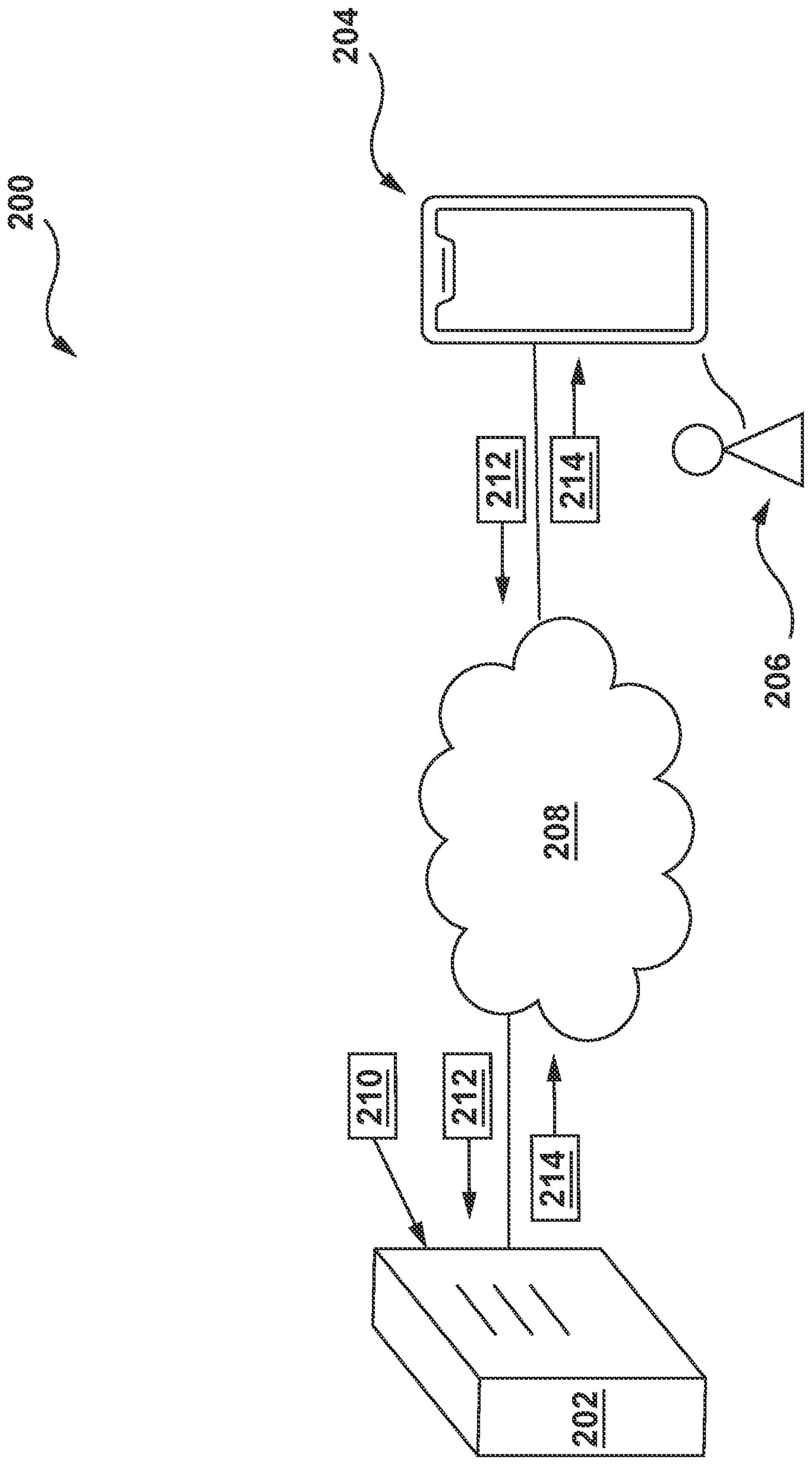
FIG. 2 depicts a networked computing environment configurable for generating a fine-tuning set of data for fine-tuning a generative machine-learning model (GMLM) hosted by a server present in the networked computing environment, to generate more visually appealing images of objects, in accordance with certain non-limiting embodiments of the present technology.

With reference to FIG. 2, there is depicted a schematic diagram of a networked computing environment 200 suitable for use with some non-limiting embodiments of the systems and/or methods of the present technology. The networked computing environment 200 comprises a server 202 communicatively coupled, via a communication network 208, to an electronic device 204. In the non-limiting embodiments of the present technology, the electronic device 204 may be associated with a user 206.

In some non-limiting embodiments of the present technology, the electronic device 204 may be any computer hardware that is capable of running a software appropriate to the relevant task at hand. In this regard, the electronic device 204 can comprise some or all of the components of the computer system 100 of FIG. 1. Thus, some non-limiting examples of the electronic device 204 may include personal computers (desktops, laptops, netbooks, etc.), smartphones, and tablets. It should be expressly understood that, in some non-limiting embodiments of the present technology, the electronic device 204 may not be the only electronic device associated with the user 206; and the user 206 may rather be associated with other electronic devices (not depicted in FIG. 2) without departing from the scope of the present technology.

In some non-limiting embodiments of the present technology, the server 202 is implemented as a conventional computer server and may comprise some or all of the components of the computer system 100 of FIG. 1. In a specific non-limiting example, the server 202 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 202 is a single server. In alternative non-limiting embodiments of the present technology (not depicted), the functionality of the server 202 may be distributed and may be implemented via multiple servers.

Further, according to certain non-limiting embodiments of the present technology, the server 202 can be configured to host a generative machine-learning model (GMLM) 210. Broadly speaking, the GMLM 210 can be trained to generate images of objects based on textual descriptions thereof provided by users of the GMLM 210, such as the user 206. According to certain non-limiting embodiments of the present technology, the GMLM 210 can be accessible to the user 206 online, over the communication network 208. For example, the user 206 can submit a universal resource locator (URL) address of the server 202 to an address bar of a browser application (not separately numbered) run by the electronic device 204, and the browser application can be configured to render a Graphical User Interface (GUI) of the GMLM 210 on a screen of the electronic device 204.

Figure 3:
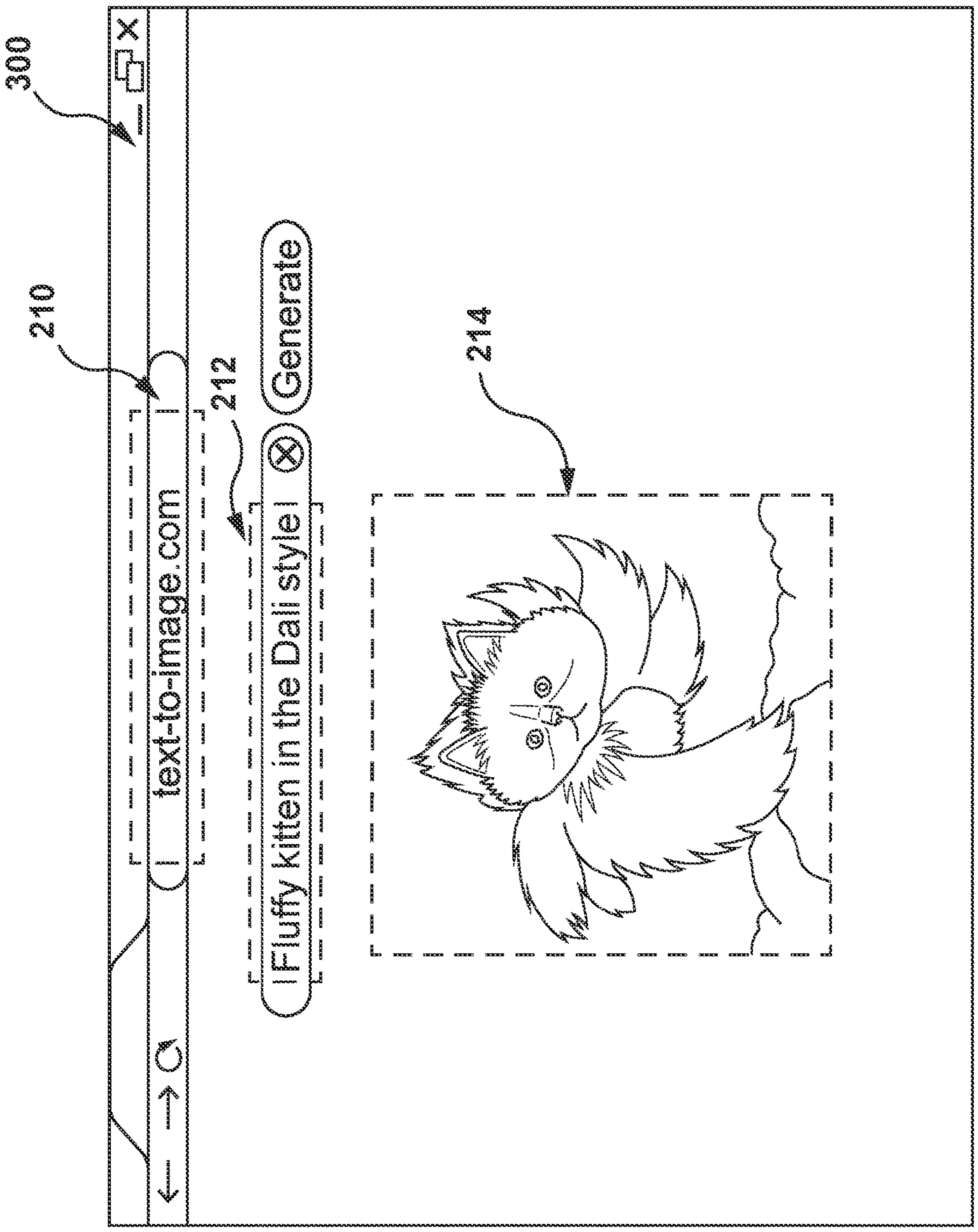
FIG. 3 depicts a schematic diagram of a Graphical User Interface (GUI) of the GMLM hosted by the server present in the networked computing environment of FIG. 2, in accordance with certain non-limiting embodiments of the present technology.

With continued reference to FIG. 2, and with reference to FIG. 3, there is depicted a first GUI 300 of the GMLM 210 rendered by the browser application of the electronic device 204, in accordance with certain non-limiting embodiments of the present technology.

As it can be appreciated from FIG. 3, in some non-limiting embodiments of the present technology, the first GUI 300 of the GMLM 210 can include a query bar (not separately numbered) for receiving user queries and an actuator, such as a "Generate" button (not separately numbered), for submitting the user queries to the GMLM 210. Thus, the user 206 can submit a given query 212 to the GMLM 210 including a textual description, which can include (i) a name of an object in a natural language (such as Russian or English, for example), an image of which the user 206 would like to have generated, such as "FLUFFY KITTEN", as best shown in FIG. 3; and, optionally, (ii) at least one rendering instruction with respect to a desired fashion, in which the user 206 would like the object to be generated in the image, such as "IN THE DALI STYLE". In response, the GMLM 210 can be configured to generate an image 214 of the requested object following the at least one rendering instruction.

It is not limited how the GMLM 210 can be implemented. For example, in some non-limiting embodiments of the present technology, the GMLM 210 can be implemented as a Contrastive Language-Image Pretraining (CLIP)-based GMLM, details on training and using of which are described, for example, in an article authored by Radford et al., entitled "LEARNING TRANSFERABLE VISUAL MODELS FROM NATURAL LANGUAGE SUPERVISION", and published by OpenAI Inc. on Feb. 26, 2021, the content of which is incorporated herein by reference in its entirety.

In other non-limiting embodiments of the present technology, the GMLM 210 can be implemented as a diffusion model, trained to gradually denoise training images, to which a random noise, such as a random Gaussian noise, has been preliminarily added. Broadly, the diffusion comprises: (i) an encoder configured to generate, for a given training image, a respective image vector representation thereof in a latent embedding space; (ii) a diffusion algorithm configured to sequentially induce a certain amount of random noise to the respective image vector representation of the given training image, thereby generating at least one respective noisy image vector representation of the given training image; (iii) a text encoder configured to generate a respective text vector representation of a training textual description associated with the given training image; (iv) a conditional denoising algorithm configured to determine the amount of the random noise applied to the at least one respective noisy image vector representation by the diffusion algorithm, mapping the respective text vector representation to the at least one respective noisy image vector representation, thereby determining latent relations therebetween; and (v) a decoder configured to reconstruct the given training image based on a denoised respective vector representation thereof, generated by the denoising algorithm.

In a specific non-limiting example, the conditional denoising algorithm (also referred to as a "backbone" of the diffusion model) can be implemented as time-conditional UNet-based neural network (NN). In this example, to determine the latent relations between the respective text vector representation and the at least one respective noisy image vector representation associated with the given training image, the diffusion model can be configured to map the respective text vector to intermediate layers of the UNet-based NN via cross-attention layers. Further, in a specific non-limiting example, the text encoder can be implemented as a Transformer-based machine-learning model that has been pre-trained to determine contextual and grammatical relations between linguistic units, such as words, sentences, or even paragraphs, of text written in the natural language.

Thus, by (i) feeding to the diffusion model a training set of data including training images and respective textual descriptions associated therewith; and (ii) optimizing a difference between inputs (trained images) and outputs (generated images) of the diffusion model, the GMLM 210 could be trained to generate images of objects from the random noise. More specifically, after optimizing the difference between the inputs and outputs of the diffusion model, at each training iteration, a backpropagation algorithm can be applied to the diffusion model, and node weights thereof can further be adjusted. The difference can be expressed by a loss function, such as a Cross-Entropy Loss Function. However, other implementations of the loss function are also envisioned, including, without limitation, a Mean Squared Error Loss function, a Huber Loss function, a Hinge Loss function, and others.

More details on how the diffusion model can be implemented according to certain non-limiting embodiments of the present technology are described, for example, in an article authored by Rombach et al., entitled "HIGH-RESOLUTION IMAGE SYNTHESIS WITH LATENT DIFFUSION MODELS", and published by the Ludwig Maximilian University of Munich on Apr. 13, 2022, the content of which is incorporated herein by reference in its entirety. It should be expressly understood that other MLMs and architectures thereof can be used for implementing the GMLM 210 without departing from the scope of the present technology.

In some non-limiting embodiments of the present technology, the GMLM 210 can be trained by the server 202. In these embodiments, the server 202 can be configured to obtain the training set of data, for example, from electronic devices of the users of the GMLM 210, such as the electronic device 204 of the user 206. More specifically, the server 202 can be configured to: (i) access web and/or search history log of the user 206 stored on the electronic device 204; (ii) parse the web and/or search history log of the user 206 to identify past search queries for images; and (iii) store, in a training database (not depicted), the past search queries associated with images responsive thereto. In other non-limiting embodiments of the present technology, the server 202 can be configured to obtain the training set of data from a third-party resource, such as a picture bank (for example, a GettyImages™ picture bank, a ShutterStock™ picture bank, and the like) storing various images with respective textual descriptions thereof.

However, in other non-limiting embodiments of the present technology, the GMLM 210 can be trained as described above by a third-party server (not depicted), and the server 202 can further be provided with access to the GMLM 210 either remotely, via the communication network 208, or locally.

As it can be appreciated, the GMLM 210 trained as described above may not be capable of "appreciating" certain abstract categories of the so generated images, such as the image 214, appreciated by humans, which can thus affect the user experiences of the user 206. In other words, the GMLM 210 may be incapable of determining whether the image 214, generated in response to the given query 212, would be perceived by the user 206 as being visually attractive or not. Thus, if the user 206 considers the image 214 as being not visually appealing, that is, the user 216 does not gain expected aesthetic pleasure from viewing the image 214, the user 206 can be left generally dissatisfied with the GMLM 210.

Thus, the present method and systems are directed to tackling this problem by fine-tuning the GMLM 210 using a specific fine-tuning training set of data including: (i) training images; (ii) respective queries used for generating the training images; and (iii) respective degrees of visual appeal of the training images to the users of the GMLM 210. Using such a training set of data, the server 202 can be configured to fine-tune the GMLM 210 to generate more visually appealing images in response to queries of the users. By doing so, the present methods and systems may help improve the user satisfaction of the users of the GMLM 210 from interacting therewith.

How the server 202 can be configured to generate the fine-tuning training set of data including determining the respective degrees of visual appeal for the training images, in accordance with certain non-limiting embodiments of the present technology, will be described below with reference to FIGS. 3 to 6.

Communication Network

In some non-limiting embodiments of the present technology, the communication network 208 is the Internet. In alternative non-limiting embodiments of the present technology, the communication network 208 can be implemented as any suitable local area network (LAN), wide area network (WAN), a private communication network or the like. It should be expressly understood that implementations for the communication network are for illustration purposes only. How a respective communication link (not separately numbered) between each one of the server 202, the electronic device 204, and the communication network 208 is implemented will depend, inter alia, on how each one of each one of the server 202 and the electronic device 204 is implemented. Merely as an example and not as a limitation, in those embodiments of the present technology where the electronic device 204 includes a wireless communication device, the communication link can be implemented as a wireless communication link Examples of wireless communication links include, but are not limited to, a 3G communication network link, a 4G communication network link, and the like. The communication network 208 may also use a wireless connection with the server 202.

Generating a Fine-Tuning Dataset

Figure 4:
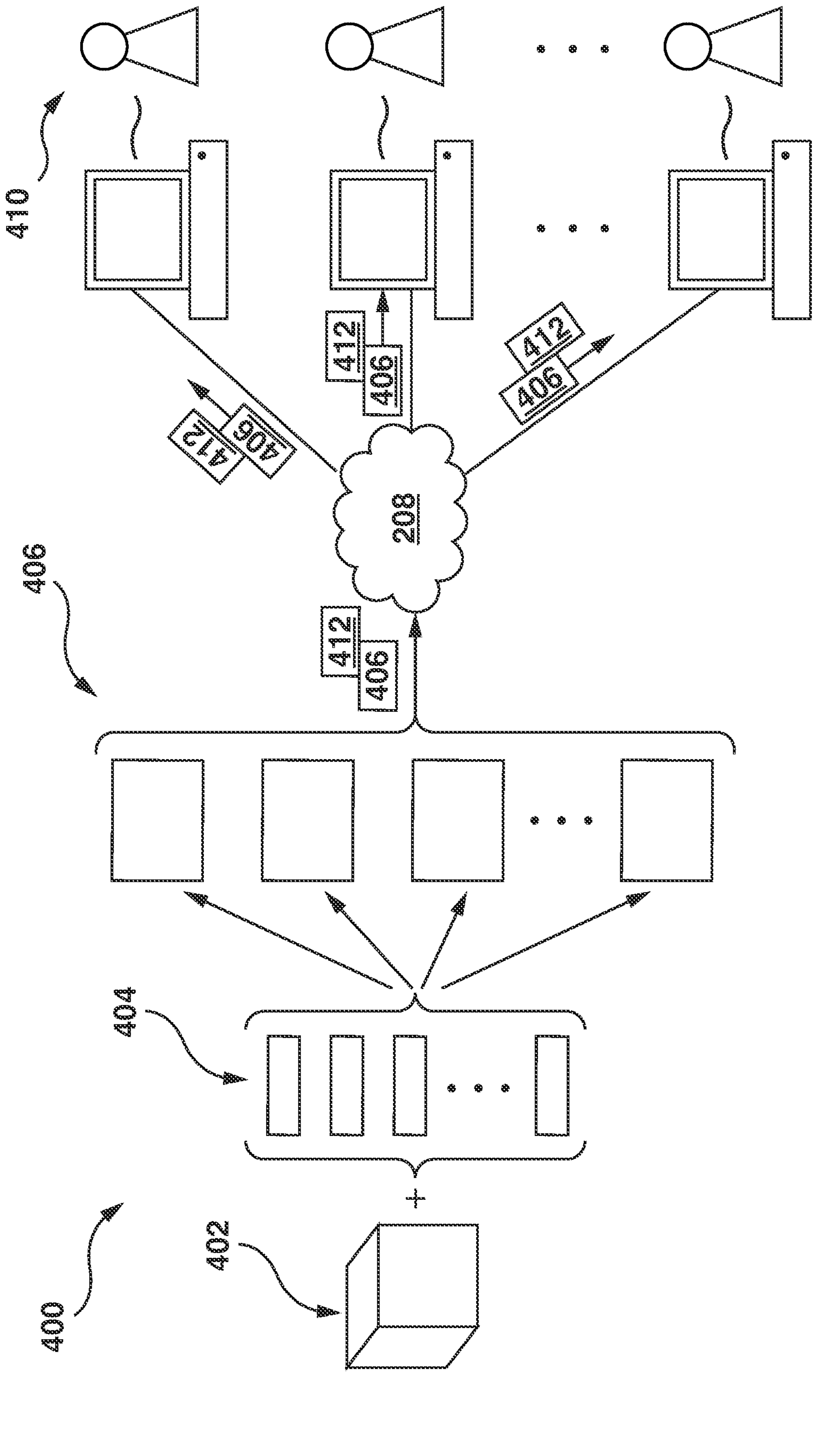
FIG. 4 depicts a schematic diagram of a training data generating procedure for generating, by the server present in the networked computing environment of FIG. 2, the fine-tuning set of data, in accordance with certain non-limiting embodiments of the present technology.

With reference to FIG. 4, there is depicted a schematic diagram of a training data generating procedure 400, executed, by the server 202, for generating the fine-tuning training set of data for fine-tuning the GMLM 210, in accordance with certain non-limiting embodiments of the present technology.

According to certain non-limiting embodiments of the present technology, the server 202 can be configured to generate the fine-tuning training set of data by: (i) acquiring a textual description 402 of a given training object for generating a respective training image thereof; (ii) acquiring, for the given training object, a set of keywords 404; (iii) generating, using the set of keywords 404, a set of augmented textual descriptions of the given training object; (iv) feeding the set of augmented textual descriptions to the GMLM 210 to generate a set of image candidates 406; and (v) determining, for each of the set of image candidates 406, a respective degree of visual appeal thereof to the users of the GMLM 210.

Further, the server 202 can be configured to generate the fine-tuning set of data including a fine-tuning plurality of training digital objects, a given one of which can include: (i) the textual description 402 of the given training object; (ii) a given image candidate of the set of image candidates 406 of the given training object; and (iii) the respective degree of visual appeal determined for the given image candidate.

Also, in additional non-limiting embodiments of the present technology, the server 202 can be configured to: (i) identify those of the set of keywords 404 associated with the image candidates of the set of image candidates 406 having highest respective degrees of visual appeal; and (ii) output these keywords as suggests for generating in-use augmented textual descriptions for the in-use object for further submitting to the GMLM 210.

Needless to say, the given training object can be any entity that can be described by nouns in the natural language. As such, in the context of the present specification, the given training object can be one of: (i) an animate object, such as a person or an animal; and (ii) an inanimate object, such as a plant (for example, a tree or a flower), a furniture item, a vehicle, and the like. Thus, the textual description 402 of the given training object comprises a description thereof in the natural language, that is, what the given training object is.

According to certain non-limiting embodiments of the present technology, it is not limited how the server 202 can be configured to acquire the textual description 402 of the given training object for generating the fine-tuning set of data. For example, in some non-limiting embodiments of the present technology, the textual description 402 of the given training object can be from a pre-determined list of textual descriptions of training objects that the server 202 can be configured to obtain, for example, via the communication network 208, from a third-party server, such as a third-party web server. In another example, the predetermined list of textual descriptions of training objects can be uploaded to the server 202 by an operator of the GMLM 210.

In other non-limiting embodiments of the present technology, the server 202 can be configured to acquire the textual description 402 of the given training object via crawling various web resources of the communication network 208, such as, without limitation, reference web resource (a Wikipedia™ online encyclopedia, a Britannica™ online encyclopedia, and the like), social networks (a VK.COM™ social network, a My World™ social network, and the like), and audio- and video streaming platforms (such as a Kinopoisk™ video streaming platform, an IVI.RU™ video streaming platform, and the like), for example. More specifically, via the crawling, the server 202 can be configured to identify nouns or expressions indicative of objects' names for populating an object database (not depicted) of the server 202, configured to store various textual descriptions of training objects for further use in generating the fine-tuning set of data.

In yet other non-limiting embodiments of the present technology, the server 202 can be configured to acquire textual descriptions of training objects from past queries submitted by the users of the GMLM 210 thereto. In these embodiments, the server 202 can be preliminarily configured to store the past queries in a past query database (not depicted) of the server 202 for further identifying therefrom (such as by parsing) nouns and expression indicative of the objects' names and populating the object database (not depicted).

Additionally, in some non-limiting embodiments of the present technology, the server 202 can be configured to execute a natural language understanding (NLU) algorithm configured to resolve ambiguities among semantically similar textual descriptions of the training objects. For example, using the NLU algorithm, the server 202 can be configured to determine that textual descriptions "CAT", "MR. MITTENS", and "KITTY" are referring to a single training object.

According to certain non-limiting embodiments of the present technology, a given keyword of the set of keywords 404 can comprise a word or an expression, which is indicative of a respective rendering instruction for rendering the given training object in the training image. Similar to acquiring the textual description, in some non-limiting embodiments of the present technology, the server 202 can be configured to acquire the set of keywords 404 for the textual description 402 of the given training object from one of the third-party server (not depicted) or the operator of the GMLM 210. Also, in other non-limiting embodiments of the present technology, the server 202 can be configured to obtain the set of keywords 404 from the past queries submitted to the GMLM 210.

In yet other non-limiting embodiments of the present technology, the server 202 can be configured to acquire the set of keywords 404 for the textual description 402 of the given training object from a Natural Language Processing (NLP) model (not depicted). Broadly speaking, the NLP model is a machine-learning model trained to read, understand, and produce instances of natural language. In other words, the NLP model can be said to execute two distinct processes: (i) a natural language understanding process, for example, for understanding the textual description 402 of the given training object; and (ii) a natural language generation process for generating, based on the structured data, keywords for inclusion in the set of keywords 404.

In some non-limiting embodiments of the present technology, the NLP model can be implemented based on an NN, such as a Long short-term memory NN or a recurrent NN. However, according to certain non-limiting embodiments of the present technology, the NLP model can be implemented as a Transformer-based NN model. More details on training and using the NLP model can be obtained, for example, from a co-owned U.S. patent application Ser. No. 18/081,634, filed on Dec. 14, 2022, entitled "METHOD AND SYSTEM FOR FOR RECOGNIZING A USER UTTERANCE", content of which is incorporated herein by reference in its entirety.

In some non-limiting embodiments of the present technology, the set of keywords 404 can be object-specific to the given training object, that is, can apply only to the given training object and object similar thereto. For example, in these embodiments, if the textual description 402 of the given training object reads "CAT", one of the set of keywords 404 can read "PLAYING WITH YARN" or "GROOMS ITSELF", and the like. In other non-limiting embodiments of the present technology, the set of keywords 404 can be object-invariant to the given training object, that is, can apply to various objects, not limited to the given training object. Continuing with the above example, in these embodiments, if the textual description 402 of the given training object is "CAT", one of the set of keywords 404 can be "DIGITAL ART" or "HIGH DEFINITION", and the like.

In some non-limiting embodiments of the present technology, the given keyword of the set of keywords 404 can be indicative of a respective desired feature of the respective image candidate of the set of image candidates 406 to be generated by the GMLM 210 in response to a query including the given keyword. For example, the respective desired feature can include at least one of: (i) a stylistic feature of the respective image candidate; and (ii) a meta feature of the respective image candidate.

According to certain non-limiting embodiments of the present technology, the stylistic feature can comprise at least one of: (i) a colour scheme of the respective image candidate, such as, without limitation, a monochromatic color scheme, an analogous color scheme, a complementary color scheme, and the like; (ii) intensity of at least one colour of the respective image candidate, such as, vivid or dull; (iii) an artistic style of the respective image candidate, such as impressionism, surrealism, social realism, and the like; or after an artist's name, such as the Dali style, the Kandinsky style, the Savrasov style, and the like; and (iv) features associated with at least one composition element of the respective image candidate.

According to certain non-limiting embodiments of the present technology, the at least one composition element of the respective image candidate can include, without limitation, at least one of: a point of interest in the respective image candidate, a texture of the respective image candidate, a symmetry of the respective image candidate, an asymmetry of the respective image candidate, a depth of field of the respective image candidate, lines in the respective image candidate, curves in the respective image candidate, frames of the respective image candidate, a contrast of the respective image candidate, a viewpoint onto the training object in the respective image candidate, a proportion of negative space in the respective image candidate, a proportion of a filled space in the respective image candidate, a foreground of the respective image candidate, a background of the respective image candidate, and a visual tension of the respective image candidate.

By contrast, in some non-limiting embodiments of the present technology, the meta feature of the respective image candidate can comprise at least one of: (i) a resolution of the respective image candidate, such as 100 pixels per inch (ppi), 300 ppi, or 600 ppi, and the like; (ii) a size of the respective image candidate, such as 5 Mb, 10 Mb, or 1 Gb, and the like; and (iii) a format of the respective image candidate, such as JPG, PNG, PSD, and the like.

Thus, by combining the textual description 402 of the given training object and each one of the set of keywords 404 associated therewith, the server 202 can be configured to generate the set of augmented textual descriptions of the given training object. Continuing with the example where the textual description 402 of the given training object is "CAT", a first one of the set of augmented textual expressions can be "CAT, OLD CARTOON DRAWING", a second one of the set of augmented textual expressions can be "CAT, DISNEY DRAWING, MONOCHROMATIC SCHEME", a third one of the set of augmented textual expressions can be "CAT, ANIME DRAWING, VIVID COLORS", and so on. It should be expressly understood that these examples are given for illustrative purposes only and in no way can be considered limitative.

Furthermore, in some non-limiting embodiments of the present technology, a number of keywords in the set of keywords 404, defining the number of augmented textual descriptions in the set of augmented textual descriptions of the given training object, can be pre-determined, such as 10, 20, or 50, for example. For example, in the embodiments where the server 202 can be configured to obtain the set of keywords 404 from the past queries, the server 202 can be configured to retrieve top-N frequently used keywords either (i) for generating the past queries for images in general or (ii) in combination with the textual description 402 of the given training object. However, in other non-limiting embodiments of the present technology, the server 202 can be configured to use all keywords identified from the past queries for generating the set of augmented textual descriptions of the given training object.

Thus, using the so generated set of augmented textual descriptions of the given training object, the server 202 can further be configured to feed each one of the set of augmented textual descriptions to the GMLM 210, thereby generating the set of image candidates 406 of the given training object.

Further, as mentioned above, the server 202 can be configured to determine, for each of the set of image candidates, the respective degree of visual appeal thereof to the users of the GMLM 210. According to certain non-limiting embodiments of the present technology, the server 202 can be configured to determine the respective degree of visual appeal of the given image candidate of the set of image candidates 406 based on inputs of human assessors.

To that end, in some non-limiting embodiments of the present technology, the server 202 may be configured to execute a crowdsourcing application (not depicted). For example, the crowdsourcing application may be implemented as a crowdsourcing platform such as Yandex.Toloka™ crowdsourcing platform, or other proprietary or commercially available crowdsourcing platform. Further, the server 202 can be configured to host (or otherwise have access to) an assessor database (not depicted) including data of a plurality of human assessors 410.

For example, in some non-limiting embodiments of the present technology, the assessor database can be under control and/or management of a provider of crowd-sourced services, such as Yandex LLC of Lev Tolstoy Street, No. 16, Moscow, 119021, Russia. In alternative non-limiting embodiments of the present technology, the assessor database can be operated by a different entity.

Thus, in some non-limiting embodiments of the present technology, the server 202 can be configured to transmit the set of image candidates 406 along with a respective digital task 412 to respective electronic devices of a plurality of human assessors 410. Needless to say, each electronic device of the plurality of human assessors 410 can be implemented in a similar manner to the electronic device 204 associated with the user 206.

Figure 5:
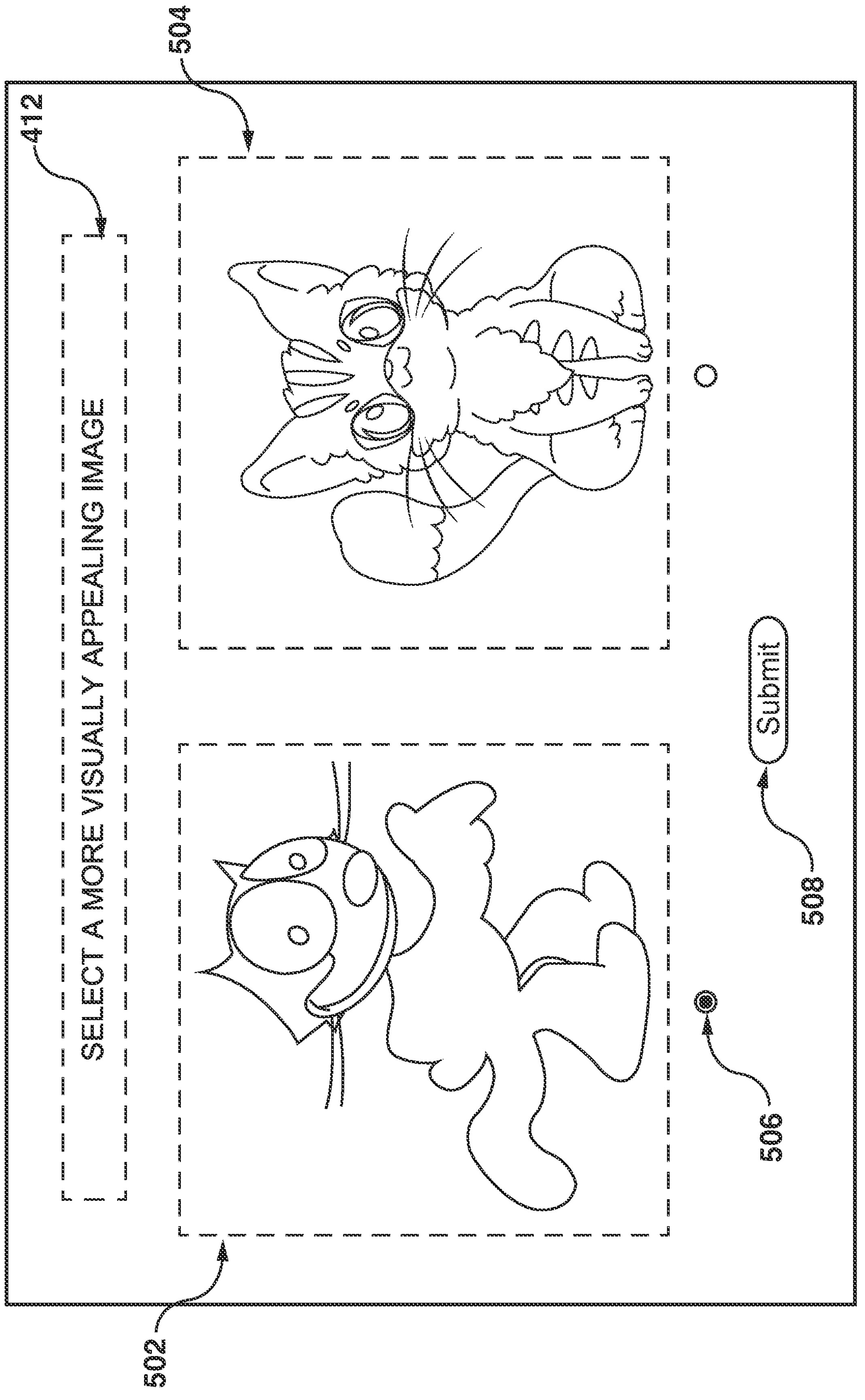
FIG. 5 depicts a schematic diagram of a GUI of a crowdsourcing application run on the server present in the networked computing environment of FIG. 2 for executing an example digital task by one of assessors for generating the fine-tuning set of data, in accordance with certain non-limiting embodiments of the present technology.

According to certain non-limiting embodiments of the present technology, the respective digital task 412 can comprise a pairwise comparison of the set of image candidates 406 based on how visually appealing each one of the set of image candidates 406 to a given human assessor of the plurality of human assessors 410. With reference to FIG. 5, there is depicted a schematic diagram of a second GUI 500 of the crowdsourcing application of the server 202 rendered on a screen of the respective electronic device of the the given human assessor of the plurality of human assessors 410, in accordance with certain non-limiting embodiments of the present technology.

As it can be appreciated for FIG. 5, the second GUI 500 includes a textual representation of the respective digital task 412 and a pair of image candidates of the set of image candidates 406, including a first image candidate 502 and a second image candidate 504 to be compared by the given human assessor. Also, the second GUI 500 may include selection GUI elements 506 allowing selecting one of the first and second image candidates 502, 504. In the embodiments illustrated in FIG. 5, the selection GUI elements 506 are radio buttons; however, in other non-limiting embodiments of the present technology, the selection GUI elements 506 can be checkboxes, for example. Further, in some non-limiting embodiments of the present technology, the second GUI 500 can further include an actuator GUI element 508, such as a "Submit" button, for confirming the selection of the one of the first and second image candidates 502, 504.

In some non-limiting embodiments of the present technology, the pair of image candidates can be presented for comparison to the given human assessor without respective augmented textual descriptions thereof. In other words, the given human assessor will have to select the one of the first and second image candidates 502, 504, based on how visually appealing the given human assessor perceives each one of the pair of image candidates, without knowing which keywords from the set opf keywords 404 have been used for generation thereof. This may help reduce bias of the given human assessor during the comparison process.

Once the given human assessor has selected, for example, the first image candidate 502 out of the pair of image candidates, the second image candidate 504 will be replaced by an other image candidate (not depicted) from the set of image candidate 406, and an other pair of image candidates including the first image candidates 502 and the other image candidates will then be presented to the given human assessor via the second GUI 500. Further, the given human assessor will make another selection out of the other pair of image candidates. This process will continue until the given human assessor is presented with each image candidate from the set of image candidates 406 at least once.

It should be noted that other comparison schemes for implementing the present technology are also envisioned. For example, for expediting the comparison routine, the server 202 can be configured to present the image candidates to the given human assessor in triplets, or even in a number of five, for example, with the same respective digital task.

Further, according to certain non-limiting embodiments of the present technology, the server 202 can be configured to determine the respective degree of visual appeal of the given image candidate of the set of image candidates 406 as a number of instances the given image candidates has been selected, during the pairwise comparison, as a more visually appealing one than the other image candidate across all of the plurality of human assessors 410.

Further, the server 202 can be configured to apply the training data generating procedure 400 described above to a plurality of training objects including, for example, hundreds, thousands, or even hundreds of thousands similar to the given training object, thereby generating the fine-tuning set of data. As mentioned above, by doing so, the server 202 can be configured to generate the fine-tuning set of data including the plurality of training digital objects, the given one of which includes: (i) the textual description 402 of the given training object; (ii) the given image candidate of the set of image candidates 406 of the given training object; and (iii) the respective degree of visual appeal determined for the given image candidate as described above.

The server 202 can further be configured to use the so generated fine-tuning set of data for fine-tuning the GMLM 210 to generate more visually appealing images of objects. In some non-limiting embodiments of the present technology, the fine-tuning the GMLM 210 can include two fine-tuning stages, where (i) during a first finetuning stage, the server 202 can be configured to train the GMLM 210 to determine which image candidate of a given pair of image candidates of the given training object has a greater respective degree of visual appeal; and (ii) during a second fine-tuning stage following the first fine-tuning stage, using a reinforcement training approach, the server 202 can be configured to train GMLM 210 to generate more visually appealing images of the objects.

More specifically, to execute the first fine-tuning stage, in some non-limiting embodiments of the present technology, the server 202 can be configured to add, to the GMLM 210, a Feed-Forward NN layer, which the server 202 is further configured to train to compare the given pair of image candidates of the given training object in terms of visual appeal. To do so, first, the server 202 can be configured to identify a first portion of the fine-tuning set of data such that the given training digital object thereof includes: (i) the textual description 402 of the given training object; (ii) the given image candidate of the set of image candidates 406 of the given training object; and (iii) the respective degree of visual appeal determined for the given image candidate. Further, the server 202 can be configured to feed, to the GMLM 210, training digital objects of the first portion of the fine-tuning set of data associated with the given training object by pairs, to train the GMLM 210 such that the Feed-Forward NN layer thereof generates a respective value indicative of whether the respective degree of visual appeal associated with a first training digital object of a given pair of digital objects is greater than the respective degree of visual appeal associated with a second training digital object of the given pair of training digital objects. For example, in some non-limiting embodiments of the present technology, the respective value can be a binary value being 1 (or "TRUE") if the respective degree of visual appeal associated with the first training digital object is greater than that of the second training digital object; or being 0 (or "FALSE") otherwise.

Further, to execute the second fine-tuning stage, in some non-limiting embodiments of the present technology, the server 202 can be configured to identify a second portion of the fine-tuning set of data such that the given training digital object thereof only includes the textual description 402 used for generating the given image candidate of the given training object. Further, the server 202 can be configured to feed, to the GMLM 210, each training digital object of the second portion of the fine-tuning set of data to generate respective image candidates, maximizing a total value (also referred to herein as a "cumulative reward") determined as being a combination (such as a summation, for example) of respective values generated, at each training iteration, by the Feed-Forward NN layer of the GMLM 210. To maximize the total value, the server 202 can be configured to apply, for example, a Proximal Policy Optimization algorithm. However, use of other optimization algorithms, such as one of a Deep Deterministic Policy Gradient algorithm, a Trust Region Policy Optimization algorithm, or a Twin Delayed Deep Deterministic Policy Gradient algorithm, for example, for maximizing the total value is also envisioned without departing from the scope of the present technology.

By doing so, the server 202 can be configured to fine-tune the GMLM 210 to generate more visually appealing images of the objects. Thus, in response to receiving an in-use textual description of an in-use object from the user 206, the GMLM 210 can be configured to generate a respective in-use image, which would be more visually appealing to the user 206 than an image generated based on the same in-use textual description prior to fine-tuning the GMLM 210 described above.

It should be expressly understood that, in some non-limiting embodiments of the present technology, the server 202 can be configured to use the fine-tuning set of data for an initial training of the GMLM 210.

Figure 6:
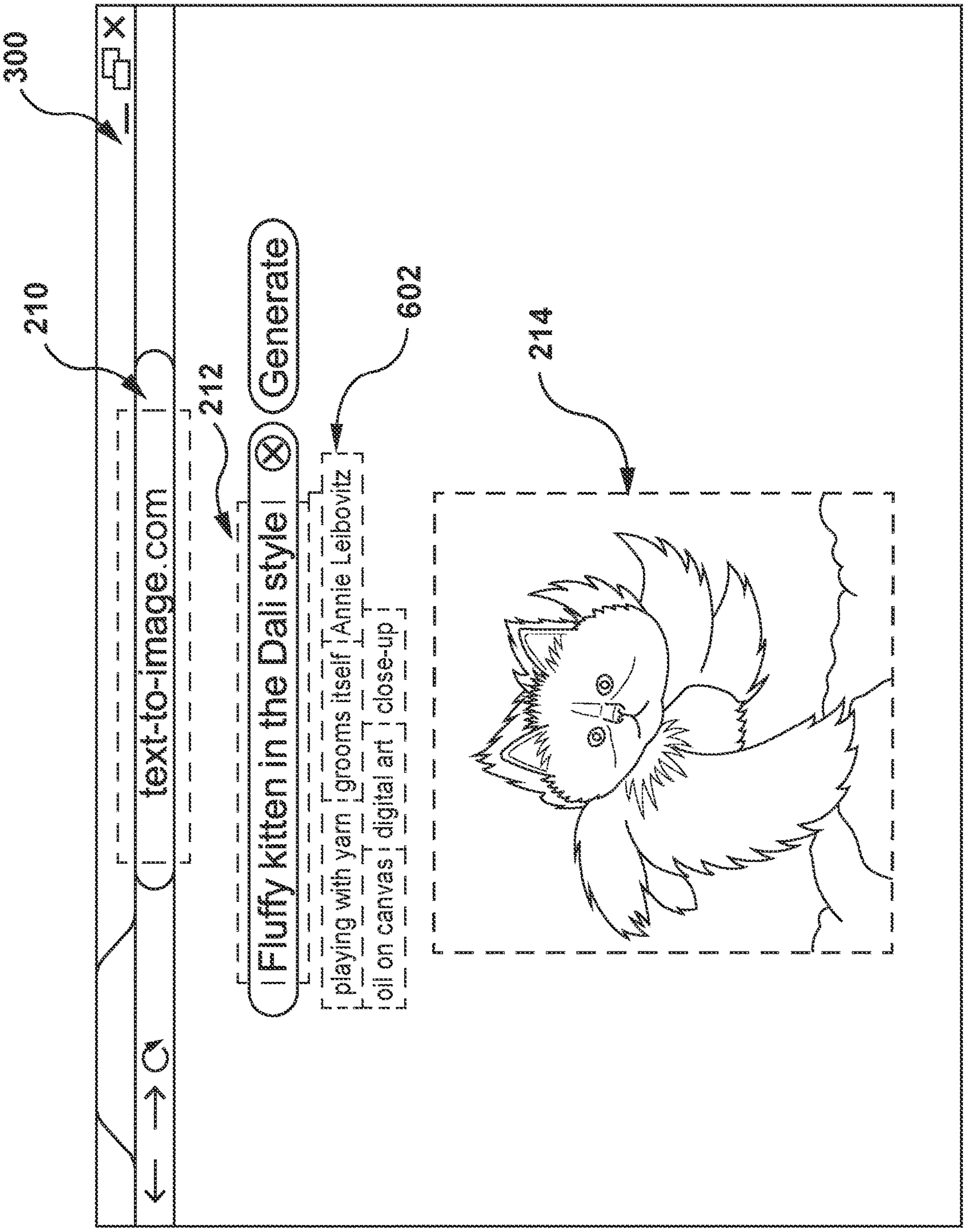
FIG. 6 depicts a schematic diagram of a modified GUI of the GMLM including suggests for generating more visually appealing images, in accordance with certain non-limiting embodiments of the present technology.

In yet other embodiments, the server 202 can be configured to use respective degrees of visual appeal determined based on inputs of the plurality of human assessors 410 for causing the GMLM 210 to generate more visually appealing images of the objects without fine-tuning the GMLM 210. More specifically, in these embodiments, the server 202 can be configured to: (i) rank the set of image candidates 406 in accordance with the respective degrees of visual appeal associated therewith; (ii) select a top-N number image candidates associated with highest respective degrees of visual appeal; (iii) determine reference keywords of the set of keywords 404 as being those keywords that have been used to generate the top-N image candidates; and (iv) output the reference keywords as suggests for generating textual descriptions of more visually appealing images of the objects, such as suggests 602 schematically depicted in the first GUI 300 of the GMLM as illustrated by FIG. 6, in accordance with certain non-limiting embodiments of the present technology.

Various implementations of the suggests 602 are envisioned. For example, in some non-limiting embodiments of the present technology, as depicted in FIG. 6, the suggests 602 can be drag and drop GUI elements disposed under the query bar of the GMLM 210 in the first GUI 300. Thus, when generating an other query, after entering a respective textual description of the other object, the user 206 can select a desired keyword, and by dragging it, can put it directly to the query bar of the GMLM 210, next to the respective textual description. The desired keyword would then complement the respective textual description by providing the respective rendering instruction for rendering the other object in the image to be generated. In other non-limiting embodiments of the present technology (not depicted), the suggests 602 can be presented to the user 206, for example, in a dropdown menu appearing from the query bar of the GMLM 210 as the user 206 enters the respective textual description of the other object.

Akin to the set of keywords 404, in some non-limiting embodiments of the present technology, the suggests 602 can be object-specific to the other; and hence, the server 202 can be configured to output the suggest 602 in response to receiving the respective textual description of the other object; and identifying an object class of the other object. However, in other non-limiting embodiments of the present technology, the suggests 602 can be object-invariant, and can thus be output in the first GUI 300 of the GMLM 210 prior to the user 206 entering the respective textual description of the other object.

Thus, by using the keywords associated with higher respective degrees of visual appeal of image candidates of training objects, the user 206 can now generate more visually appealing images of other objects.

First Method

Figure 7:
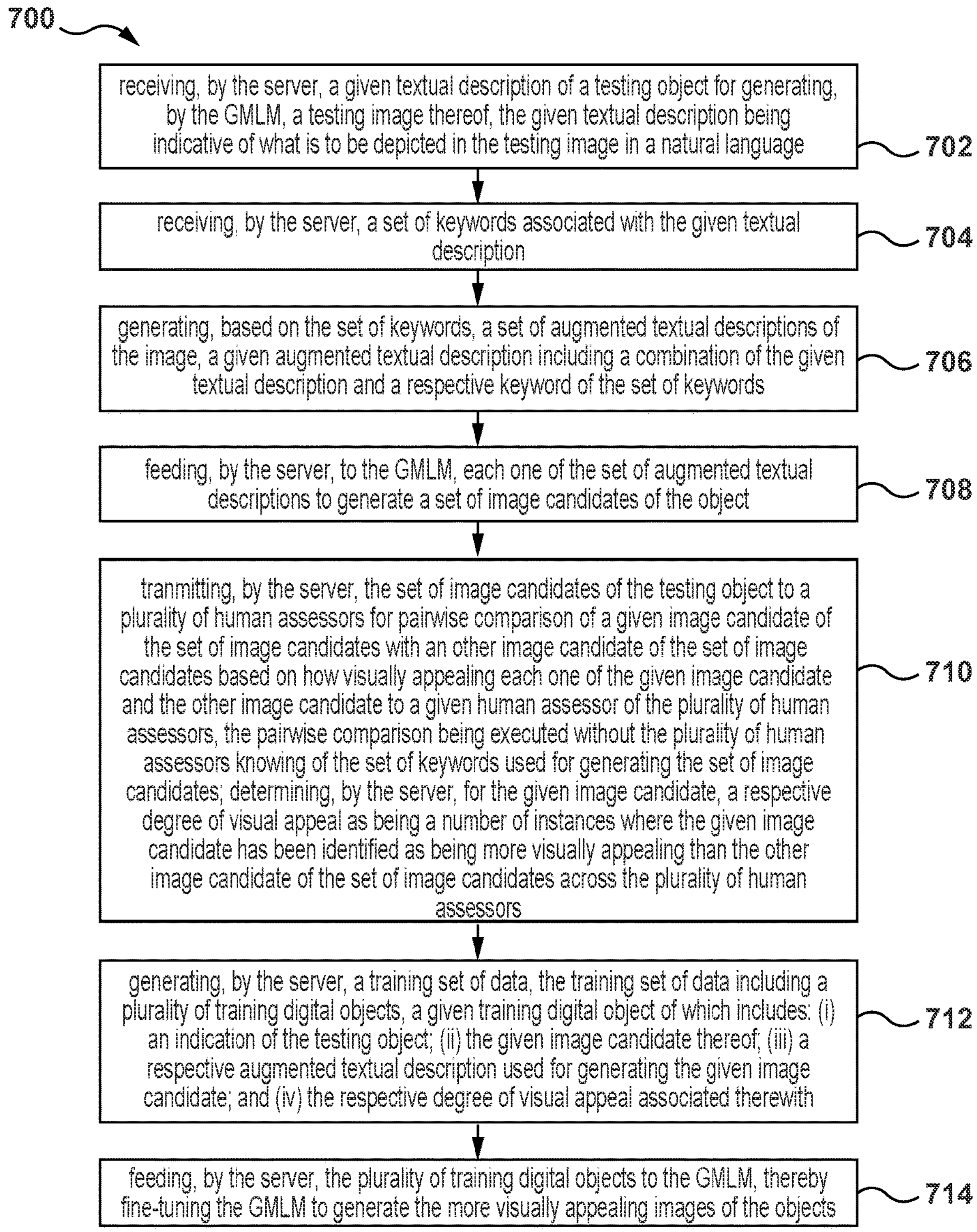
FIG. 7 depicts a flowchart diagram of a first method of fine-tuning the GMLM, hosted by the server present in the networked computing environment of FIG. 2, to generate more visually appealing images of the objects, in accordance with certain non-limiting embodiments of the present technology.

Given the architecture and the examples provided hereinabove, it is possible to execute a method of fine-tuning a GMLM, such as the GMLM 210. With reference to FIG. 7, there is depicted a flowchart of a first method 700, according to the non-limiting embodiments of the present technology. The first method 700 can be executed by the server 202 including the computer system 100.

As mentioned hereinabove with reference to FIG. 2, according to certain non-limiting embodiments of the present technology, the GMLM 210 can be implemented as one of the diffusion MLM or a CLIP-based MLM.

Step 702: Receiving, By the Server, a Given Textual Description of a Testing Object for Generating, By the GMLM, a Testing Image Thereof, the Given Textual Description Being Indicative of What is to be Depicted in the Testing Image in a Natural Language The first method 700 commences at step 702 with the server 202 being configured to receive the textual description 402 ("CAT") of the given training object. As mentioned hereinabove with reference to FIG. 4, in some non-limiting embodiments of the present technology, the server 202 can be configured to receive the textual description 402 from the third-party server (not depicted). In other non-limiting embodiments of the present technology, the server 202 can be configured to receive the textual description 402 via crawling various web resources of the communication network 208. In yet other non-limiting embodiments of the present technology, the server 202 can be configured to receive the textual description 402 from the past queries submitted by the users of the GMLM 210 thereto.

The first method 700 hence advances to step 704.

Step 704: Receiving, By the Server, a Set of Keywords Associated With the Given Textual Description Further, at step 704, the server 202 can be configured to receive the set of keywords 404 for the textual description 402 of the given training object.

As noted further above with reference to FIG. 4, the given keyword of the set of keywords 404 can comprise a word or an expression, which is indicative of the respective rendering instruction for rendering the given training object in the training image. Similar to acquiring the textual description, in some non-limiting embodiments of the present technology, the server 202 can be configured to acquire the set of keywords 404 for the textual description 402 of the given training object from one of the third-party server (not depicted) or the operator of the GMLM 210. Also, in other non-limiting embodiments of the present technology, the server 202 can be configured to obtain the set of keywords 404 from the past queries submitted to the GMLM 210.

In yet other non-limiting embodiments of the present technology, the server 202 can be configured to acquire the set of keywords 404 for the textual description 402 of the given training object from the NLP model.

The first method 700 thus proceeds to step 706.

Step 706: Generating, Based on the Set of Keywords, a Set of Augmented Textual Descriptions of the Image, a Given Augmented Textual Description Including a Combination of the Given Textual Description and a Respective Keyword of the Set of Keywords At step 706, by combining the textual description 402 of the given training object, received at step 702, and each one of the set of keywords 404 associated therewith, received at step 704, the server 202 can be configured to generate the set of augmented textual descriptions of the given training object. In the example where the textual description 402 of the given training object is "CAT", a first one of the set of augmented textual expressions can be "CAT, OLD CARTOON DRAWING", a second one of the set of augmented textual expressions can be "CAT, DISNEY DRAWING, MONOCHROMATIC SCHEME", a third one of the set of augmented textual expressions can be "CAT, ANIME DRAWING, VIVID COLORS", and so on.

The first method 700 hence advances to step 708.

Step 708: Feeding, By the Server, to the GMLM, Each One of the Set of Augmented Textual Descriptions to Generate a Set of Image Candidates of the Object At step 708, as described above with reference to FIG. 3, the server 202 can be configured to feed each one f the set of augmented textual description to the GMLM 210 to generate the set of image candidates 406 of the given training object.

The first method 700 hence advances to step 710.

Step 710: Transmitting, By the Server, the Set of Image Candidates of the Testing Object to a Plurality of Human Assessors for Pairwise Comparison of a Given Image Candidate of the Set of Image Candidates With an Other Image Candidate of the Set of Image Candidates Based on How Visually Appealing Each One of the Given Image Candidate and the Other Image Candidate to a Given Human Assessor of the Plurality of Human Assessors, the Pairwise Comparison Being Executed Without the Plurality of Human Assessors Knowing of the Set of Keywords Used for Generating the Set of Image Candidates; Determining, By the Server, for the Given Image Candidate, A Respective Degree of Visual Appeal as Being a Number of Instances Where the Given Image Candidate has Been Identified as Being More Visually Appealing Than the Other Image Candidate of the Set of Image Candidates Across the Plurality of Human Assessors At step 710, the server 202 can be configured to determine, for each one of the set of image candidates 406 generated at step 708, the respective degree of visual appeal. As escribed in detail above with reference to FIG. 5, according to certain non-limiting embodiments of the present technology, the server 202 can be configured to determine the respective degree of visual appeal of the given image candidate of the set of image candidates 406 based on inputs of the plurality of human assessors 410.

The first method 700 hence advances to step 712.

Step 712: Generating, By the Server, a Training Set of Data, the Training Set of Data Including a Plurality of Training Digital Objects, a Given Training Digital Object of Which Includes: (I) An Indication of the Testing Object; (II) The Given Image Candidate Thereof; (III) A Respective Augmented Textual Description Used for Generating the Given Image Candidate; and (IV) The Respective Degree of Visual Appeal Associated Therewith Further, based on the respective degrees of visual appeal associated with each one of the set of image candidates 406, determined at step 710, at step 712, the server 202 can be configured to generate the fine-tuning set of data for fine-tuning the GMLM 210 to generate the more visually appealing images of the objects. As mentioned further above, the fine-tuning set of data includes the plurality of training digital objects, the given one of which includes: (i) the textual description 402 of the given training object; (ii) the given image candidate of the set of image candidates 406 of the given training object; and (iii) the respective degree of visual appeal determined for the given image candidate as described above.

The first method 700 hence advances to step 714.

Step 714: Feeding, By the Server, the Plurality of Training Digital Objects to the GMLM, Thereby Fine-Tuning the GMLM to Generate the More Visually Appealing Images of the Objects At step 714, the server 202 can further be configured to use the so generated fine-tuning set of data for fine-tuning the GMLM 210 to generate more visually appealing images of objects. In some non-limiting embodiments of the present technology, the fine-tuning the GMLM 210 can include two fine-tuning stages, the first and second fine-tuning stages described above.

More specifically, to execute the first fine-tuning stage, in some non-limiting embodiments of the present technology, the server 202 can be configured to add, to the GMLM 210, the Feed-Forward NN layer, which the server 202 is further configured to train to compare the given pair of image candidates of the given training object in terms of visual appeal. To do so, first, the server 202 can be configured to identify the first portion of the fine-tuning set of data such that the given training digital object thereof includes: (i) the textual description 402 of the given training object; (ii) the given image candidate of the set of image candidates 406 of the given training object; and (iii) the respective degree of visual appeal determined for the given image candidate. Further, the server 202 can be configured to feed, to the GMLM 210, training digital objects of the first portion of the fine-tuning set of data associated with the given training object by pairs, to train the GMLM 210 such that the Feed-Forward NN layer thereof generates a respective value indicative of whether the respective degree of visual appeal associated with a first training digital object of a given pair of digital objects is greater than the respective degree of visual appeal associated with a second training digital object of the given pair of training digital objects.

Further, to execute the second fine-tuning stage, in some non-limiting embodiments of the present technology, the server 202 can be configured to identify the second portion of the fine-tuning set of data such that the given training digital object thereof only includes the textual description 402 used for generating the given image candidate of the given training object. Further, the server 202 can be configured to feed, to the GMLM 210, each training digital object of the second portion of the fine-tuning set of data to generate respective image candidates, maximizing the total value determined as being a combination (such as a summation, for example) of respective values generated, at each training iteration, by the Feed-Forward NN layer of the GMLM 210. To maximize the total value, the server 202 can be configured to apply, for example, the Proximal Policy Optimization algorithm.

By doing so, the server 202 can be configured to fine-tune the GMLM 210 to generate more visually appealing images of the objects. Thus, in response to receiving the in-use textual description of the in-use object from the user 206, the GMLM 210 can be configured to generate the respective in-use image, which would be more visually appealing to the user 206 than the image generated based on the same in-use textual description prior to fine-tuning the GMLM 210 described above.

The first method 700 thus terminates.

Thus, certain embodiments of the first method 700 allow fine-tuning the GMLM 210 to generate the more visually appealing images of the objects, which may improve the overall user experience of the user 206 with the GMLM 210.

Second Method

Figure 8:
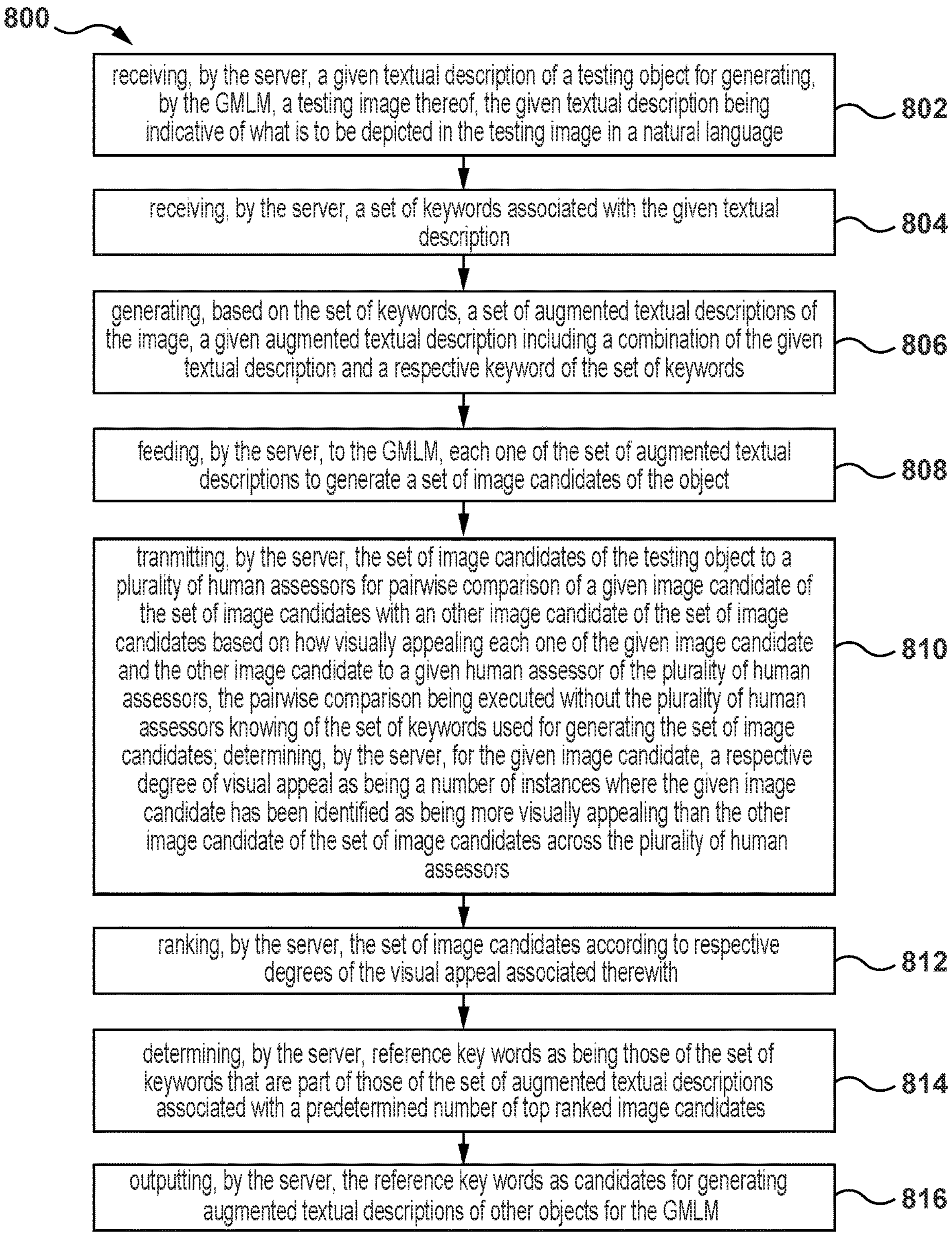
FIG. 8 depicts a flowchart diagram of a second method of generating keywords for generating augmented textual descriptions of objects for the GMLM, hosted by the server present in the networked computing environment of FIG. 2, in accordance with certain non-limiting embodiments of the present technology.

Given the architecture and the examples provided hereinabove, it is possible to execute a method of generating keywords for generating augmented textual descriptions of objects for a GMLM, such as the GMLM 210. With reference to FIG. 8, there is depicted a flowchart of a second method 800, according to the non-limiting embodiments of the present technology. The second method 800 can be executed by the server 202 including the computer system 100.

As it can be appreciated from FIG. 8, steps 802, 804, 806, 808, and 810 of the second method 800 are identical to steps 702, 704, 706, 708, and 710 of the first method 700. Thus, the description of the second method 800 will begin at step 812.

Step 812: Ranking, By the Server, the Set of Image Candidates According to Respective Degrees of the Visual Appeal Associated Therewith At step 812, according to certain non-limiting embodiments of the present technology, the server 202 can be configured to rank the set of image candidates 406 in accordance with the respective degrees of visual appeal associated therewith determined at step 810.

The second method 800 hence advances to step 814.

Step 814: Determining, By the Server, Reference Key Words as Being Those of the Set of Keywords That are Part of Those of the Set of Augmented Textual Descriptions Associated With a Predetermined Number of Top Ranked Image Candidates At step 814, according to certain non-limiting embodiments of the present technology, the server 202 can be configured to: (i) select the top-N number image candidates associated with the highest respective degrees of visual appeal; and (ii) determine the reference keywords of the set of keywords 404 as being those keywords that have been used to generate the top-N image candidates.

The second method 800 hence advances to step 816.

Step 816: Outputting, By the Server, the Reference Key Words as Candidates for Generating Augmented Textual Descriptions of Other Objects for the GMLM At step 816, the server 202 can be configured to output the reference keywords as suggests for generating textual descriptions of more visually appealing images of the objects, such as the suggests 602 schematically depicted in FIG. 6, in accordance with certain non-limiting embodiments of the present technology.

The second method 800 thus terminates.

Thus, certain non-limiting embodiments of the second method 800 allow using respective degrees of visual appeal to determine the keywords for causing the GMLM 210 to generate more visually appealing images of the objects without fine-tuning the GMLM 210. This can also help improve the user experience of the user 206 from interacting with the GMLM 210.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of fine-tuning a generative machine-learning model (GMLM), which has been trained to generate images of objects based on textual descriptions thereof, to generate more visually appealing images of the objects, the method being executable by a server configured to access the GMLM, the method comprising:

receiving, by the server, a given textual description of a testing object for generating, by the GMLM, a testing image thereof, the given textual description being indicative of what is to be depicted in the testing image in a natural language;

receiving, by the server, a set of keywords associated with the given textual description, a given keyword of the set of keywords being indicative of at least one rendering instruction for rendering the testing object in the testing image;

generating, based on the set of keywords, a set of augmented textual descriptions of the testing image, a given augmented textual description including a combination of the given textual description and a respective keyword of the set of keywords;

feeding, by the server, to the GMLM, each one of the set of augmented textual descriptions to generate a set of image candidates of the testing object;

transmitting, by the server, the set of image candidates of the testing object to a plurality of human assessors for pairwise comparison of a given image candidate of the set of image candidates with another image candidate of the set of image candidates based on how visually appealing each one of the given image candidate and the other image candidate is to a given human assessor of the plurality of human assessors, the pairwise comparison being executed without the plurality of human assessors knowing of the set of keywords used for generating the set of image candidates;

determining, by the server, for the given image candidate, a respective degree of visual appeal as being a number of instances where the given image candidate has been identified as being more visually appealing than the other image candidate of the set of image candidates across the plurality of human assessors;

generating, by the server, a training set of data, the training set of data including a plurality of training digital objects, a given training digital object of which includes: (i) the given augmented textual description of the testing object; (ii) the given image candidate thereof; and (iii) the respective degree of visual appeal associated therewith;

feeding, by the server, the plurality of training digital objects to the GMLM, thereby fine-tuning the GMLM to generate the more visually appealing images of the objects; and after fine-tuning the GMLM:

receiving, by the server, a request to generate an image of a requested object, the request comprising a textual description of the requested object;

feeding, by the server, to the GMLM, the textual description of the requested object, thereby causing the GMLM to generate the image of the requested object; and receiving, from the GMLM, the image of the requested object.

2. The method of claim 1, wherein the at least one rendering instruction comprises at least one of: (i) a stylistic feature; and (ii) a meta feature.

3. The method of claim 2, wherein the stylistic feature comprises at least one of: (i) a colour scheme; (ii) intensity of at least one colour; (iii) an artistic style; and (iv) features associated with at least one composition element.

4. The method of claim 3, wherein the at least one composition element comprises: a texture, a symmetry candidate, an asymmetry, a depth of field, lines, curves, frames, a contrast, a viewpoint, a proportion of negative space, a proportion of a filled space, a foreground, a background, and a visual tension.

5. The method of claim 2, wherein the meta feature comprises at least one of: (i) a resolution; (ii) an image size; and (iii) a format.

6. The method of claim 1, wherein the fine-tuning the GMLM comprises:

during a first fine-tuning stage, training, by the server, the GMLM to determine a respective value indicative of which image candidate of a given pair of image candidates of the testing object is associated with a greater respective degree of visual appeal;

during a second fine-tuning stage following the first fine-tuning stage, training, by the server, the GMLM to generate the more visually appealing images of the objects by maximizing a total value determined as being a combination of respective values.

7. The method of claim 6, wherein the feeding the plurality of training digital objects to the GMLM comprises:

during the first fine-tuning stage, for the given training digital object, feeding, by the server, to the GMLM: (i) the given textual description of the testing object; (ii) the given image candidate thereof; and (iii) the respective degree of visual appeal associated therewith; and during the second fine-tuning stage, for the given training digital object, feeding, by the server, to the GMLM, the given textual description used for generating the given image candidate.

8. The method of claim 6, wherein prior to the fine-tuning, the method further comprises adding to the GMLM a Feed-Forward Neural Network layer.

9. The method of claim 6, wherein the maximizing the total value comprises applying a Proximal Policy Optimization algorithm.

10. The method of claim 1, wherein the GMLM comprises a diffusion MLM.

11. A server for fine-tuning a generative machine-learning model (GMLM), which has been trained to generate images of objects based on textual descriptions thereof, to generate more visually appealing images of the objects, the server comprising at least one processor and memory storing instructions that, when executed by the at least one processor, cause the server, to:

receive a given textual description of a testing object for generating, by the GMLM, a testing image thereof, the given textual description being indicative of what is to be depicted in the testing image in a natural language;

receive a set of keywords associated with the given textual description, a given keyword of the set of keywords being indicative of at least one rendering instruction for rendering the testing object in the testing image;

generate, based on the set of keywords, a set of augmented textual descriptions of the image, a given augmented textual description including a combination of the given textual description and a respective keyword of the set of keywords;

feed, to the GMLM, each one of the set of augmented textual descriptions to generate a set of image candidates of the object;

transmit the set of image candidates of the testing object to a plurality of human assessors for pairwise comparison of a given image candidate of the set of image candidates with an another image candidate of the set of image candidates based on how visually appealing each one of the given image candidate and the other image candidate is to a given human assessor of the plurality of human assessors, the pairwise comparison being executed without the plurality of human assessors knowing of the set of keywords used for generating the set of image candidates;

determine, for the given image candidate, a respective degree of visual appeal as being a number of instances where the given image candidate has been identified as being more visually appealing than the other image candidate of the set of image candidates across the plurality of human assessors;

generate a training set of data, the training set of data including a plurality of training digital objects, a given training digital object of which includes: (i) the given augmented textual description of the testing object; (ii) the given image candidate thereof; and (iii) the respective degree of visual appeal associated therewith;

feed the plurality of training digital objects to the GMLM, thereby fine-tuning the GMLM to generate the more visually appealing images of the objects; and after fine-tuning the GMLM:

receive a request to generate an image of a requested object, the request comprising a textual description of the requested object;

feed, to the GMLM, the textual description of the requested object, thereby causing the GMLM to generate the image of the requested object; and receive, from the GMLM, the image of the requested object.

12. The server of claim 11, wherein the at least one rendering instruction comprises at least one of: (i) a stylistic feature; and (ii) a meta feature.

13. The server of claim 11, wherein to fine-tune the GMLM, the at least one processor is configured to:

during a first fine-tuning stage, train the GMLM to determine a respective value indicative of which image candidate of a given pair of image candidates of the testing object is associated with a greater respective degree of visual appeal; and during a second fine-tuning stage following the first fine-tuning stage, train the GMLM to generate the more visually appealing images of the objects by maximizing a total value determined as being a combination of respective values.

14. The server of claim 13, wherein the at least one processor is configured to feed the plurality of training digital objects to the GMLM by:

during the first fine-tuning stage, for the given training digital object, feeding to the GMLM: (i) the given textual description of the testing object; (ii) the given image candidate thereof; and (iii) the respective degree of visual appeal associated therewith; and during the second fine-tuning stage, for the given training object, feeding to the GMLM, the given textual description used for generating the given image candidate.

15. The server of claim 13, wherein prior to training the GMLM during the first fine-tuning stage, the at least one processor is further configured to add to the GMLM a Feed-Forward Neural Network layer.

16. The server of claim 13, wherein to maximize the total value, the at least one processor is configured to apply a Proximal Policy Optimization algorithm.

17. The server of claim 11, wherein the GMLM comprises a diffusion MLM.

* * * * *